(12) United States Patent
Ono et al.

(10) Patent No.: US 10,566,602 B2
(45) Date of Patent: Feb. 18, 2020

(54) DISTRIBUTION AND PROCESSING OF BATTERY ELECTRODE SLURRY AND SIMILAR SUSPENSIONS

(71) Applicant: ELIIY POWER CO., LTD., Tokyo (JP)

(72) Inventors: Takeshi Ono, Tokyo (JP); Hideo Sanada, Tokyo (JP); Hiroshi Sato, Tokyo (JP); Taisaku Nakata, Tokyo (JP)

(73) Assignee: ELIIY POWER CO., LTD., Tokyo (JP)

( * ) Notice: Subject to any disclaimer, the term of this patent is extended or adjusted under 35 U.S.C. 154(b) by 148 days.

(21) Appl. No.: 15/745,312

(22) PCT Filed: Jul. 14, 2016

(86) PCT No.: PCT/JP2016/070913
§ 371 (c)(1),
(2) Date: Jan. 16, 2018

(87) PCT Pub. No.: WO2017/014166
PCT Pub. Date: Jan. 26, 2017

(65) Prior Publication Data
US 2018/0198113 A1  Jul. 12, 2018

(30) Foreign Application Priority Data

Jul. 17, 2015  (JP) .................................. 2015-143339
Feb. 19, 2016  (JP) .................................. 2016-030125

(51) Int. Cl.
*H01M 4/04*  (2006.01)
*H01M 4/139*  (2010.01)
(Continued)

(52) U.S. Cl.
CPC .......... *H01M 4/0404* (2013.01); *B01F 5/104* (2013.01); *B01F 7/0065* (2013.01);
(Continued)

(58) Field of Classification Search
CPC ................ B01F 15/00954; B01F 5/104; B01F 7/00266; B01F 7/00341; B01F 7/00416;
(Continued)

(56) References Cited

U.S. PATENT DOCUMENTS 4,245,584 A * 1/1981 Kolosov .................. B05C 3/125
                                                            118/405
4,685,415 A * 8/1987 Wegner .................... H01M 2/14
                                                            118/425
(Continued)

FOREIGN PATENT DOCUMENTS

EP    0304093 A2   2/1989
EP    2573840 A1   3/2013
(Continued)

OTHER PUBLICATIONS

European Search Report for EP Application No. 16827726.7, dated Nov. 26, 2018.

*Primary Examiner* — Tony G Soohoo
(74) *Attorney, Agent, or Firm* — BainwoodHuang

(57) ABSTRACT

The occurrence of separation or reaggregation is suppressed in a suspension such as a battery electrode slurry. A battery electrode slurry distributing apparatus includes: a circulation pipe via which a positive electrode slurry is to be circulated; and a control unit that controls the supply of the positive electrode slurry to each of coaters. In a period in which either the coater is allowed to receive the supply of the positive electrode slurry, the control unit inhibits the supply of the positive electrode slurry to the other coater. The circulation pipe is structured in a polygonal loop. The
(Continued)

coaters are connected to respective elbow portions formed in the circulation pipe via the pipes, respectively.

20 Claims, 22 Drawing Sheets

(51) Int. Cl.
| | |
|---|---|
| *B05C 5/02* | (2006.01) |
| *B05D 1/26* | (2006.01) |
| *B05C 11/10* | (2006.01) |
| *B05C 9/10* | (2006.01) |
| *B01F 5/10* | (2006.01) |
| *B01F 7/00* | (2006.01) |
| *B01F 15/00* | (2006.01) |

(52) U.S. Cl.
CPC ...... *B01F 7/00266* (2013.01); *B01F 7/00341* (2013.01); *B01F 7/00416* (2013.01); *B01F 7/00808* (2013.01); *B01F 15/00954* (2013.01); *B05C 5/02* (2013.01); *B05C 9/10* (2013.01); *B05C 11/1002* (2013.01); *B05D 1/26* (2013.01); *H01M 4/04* (2013.01); *H01M 4/139* (2013.01)

(58) Field of Classification Search
CPC ................ B01F 7/0065; B01F 7/00808; B01F 2013/1094; B05D 1/26; H01M 4/0404; H01M 4/04; H01M 4/139; B05C 9/10; B05C 11/1002; B05C 5/02
See application file for complete search history.

(56) References Cited

U.S. PATENT DOCUMENTS

| | | | | |
|---|---|---|---|---|
| 4,707,240 A | * | 11/1987 | Parsi | B01D 61/52 204/280 |
| 5,776,251 A | * | 7/1998 | Irie | B05B 9/04 118/405 |
| 6,314,638 B1 | * | 11/2001 | Kaido | H01M 4/04 29/730 |
| 7,041,336 B2 | * | 5/2006 | Masuda | B05C 5/0258 427/256 |
| 7,105,203 B1 | * | 9/2006 | Masuda | B05C 5/0258 118/325 |
| 2013/0312238 A1 | * | 11/2013 | Shimoizumi | H01M 4/00 29/33 R |
| 2013/0312916 A1 | * | 11/2013 | Shimoizumi | H01M 4/0435 156/501 |
| 2018/0198113 A1 | * | 7/2018 | Ono | B05C 5/02 |
| 2019/0275555 A1 | * | 9/2019 | Hartley, Jr. | B05D 1/26 |

FOREIGN PATENT DOCUMENTS

| | | |
|---|---|---|
| EP | 2623192 A1 | 8/2013 |
| JP | 03178361 A | 8/1991 |
| JP | 09213310 A | 8/1997 |
| JP | 2004033924 A | 2/2004 |
| JP | 2010192920 A | 9/2010 |
| JP | 2011025183 A | 2/2011 |
| JP | 2011181465 A | 9/2011 |
| JP | 2011210738 A | 10/2011 |
| JP | 2013232365 A | 11/2013 |
| JP | 2014017064 A | 1/2014 |
| JP | 2015-100786 A | 6/2015 |

* cited by examiner

DISTRIBUTION AND PROCESSING OF BATTERY ELECTRODE SLURRY AND SIMILAR SUSPENSIONS

BACKGROUND OF THE INVENTION

1. Field of the Invention

The present invention relates to a battery electrode slurry distributing apparatus, a battery electrode slurry processing apparatus, a battery electrode slurry distributing method, a suspension distributing apparatus, a suspension distributing method, a battery electrode slurry processing method, a manufacturing apparatus, and a manufacturing method.

2. Description of the Related Art

With conventional techniques, a battery electrode slurry is applied to a thin metal sheet such as aluminum foil, copper foil, or the like, so as to manufacture a battery electrode (see Patent document 1, for example). In Patent document 1, a technique has been proposed in which, after the battery electrode slurry is filtered so as to remove aggregated active material clusters that have not been dispersed, the battery electrode slurry thus filtered is applied to a collector body that corresponds to the metal sheet by a coating apparatus.

Also, with conventional techniques, as a typical method for forming a slurry by kneading multiple materials, batch kneading is known. In batch kneading, multiple materials required to form the slurry are all placed in a large pan, and kneading is performed until the multiple materials are uniformly mixed.

However, such a batch kneading method in which the multiple materials are uniformly mixed after they are placed in the large pan all at once requires a long period of time for kneading. Furthermore, the batch kneading method requires manual operations such as replacement of the large pan, cleaning of a kneading blade and the inner wall of the large pan by scraping or the like, etc. There is a need to perform the aforementioned cleaning every time the large pan is replaced. As described above, batch kneading leads to an increased number of steps for forming the slurry.

Batch kneading requires a long period of time to form the slurry after the multiple materials are all placed in the large pan. Accordingly, in order to provide a certain amount of slurry in a short period of time, there is a need to form an increased amount of slurry for every batch kneading operation, which requires a large-size pan. Accordingly, it is difficult to employ a compact-size apparatus.

In batch kneading, a step in which the materials are fed to the large pan, a step in which the manufactured slurry is transferred to a subsequent apparatus, etc., are performed in an atmospheric environment. Accordingly, the materials and the slurry are affected by water contained in the atmosphere. This becomes a cause of adverse effects on the quality of the slurry.

Furthermore, batch kneading has a problem of a poor degree of freedom with respect to the amount of slurry to be manufactured. Specifically, in a case of forming an extra amount of slurry in order to prevent the slurry from running short, in some cases, a time lag up to the consumption of such a large amount of slurry thus formed becomes a problem.

In order to solve such a problem, a kneading apparatus has been proposed, comprising a preliminary kneading unit that coarsely kneads multiple materials, a main kneading unit that performs main kneading of the mixture thus coarsely kneaded by the preliminary kneading unit, and a Mohno pump that supplies the materials thus coarsely kneaded by the preliminary kneading unit to the main kneading unit (see Patent document 2, for example).

CITATION LIST

Patent Literature

[Patent Document 1]
 Japanese Patent Application Laid Open No. H09-213310
[Patent Document 2]
 Japanese Patent Application Laid Open No. 2004-33924

SUMMARY OF THE INVENTION

Disclosure of the Invention

Problem to be Solved by the Invention

The technique proposed in Patent document 1 has been designed assuming that a slurry supply is connected to a single coating apparatus, i.e., not assuming that such a slurry supply is connected to multiple coating apparatuses. In a case of manufacturing the same kind of battery electrodes by multiple coating apparatuses, and in a case in which the coating apparatuses respectively receive the supply of different lots of battery electrode slurry, this arrangement involves variation between the lots of the battery electrode slurry in addition to variation in the performance between the coating apparatuses. This leads to variation in the quality of the battery electrode. This problem can occur not only in the manufacturing of the battery electrodes. Rather, this problem can broadly occur in manufacturing products using a suspension.

On the other hand, in a case in which the same lot of materials is distributed to the multiple coating apparatuses via pipes or the like, this involves an increased load on a pump or the like for transferring the materials, or leads to difficulty in controlling the slurry distribution. Thus, this arrangement is not desirable.

In a case in which a suspension such as the battery electrode slurry is left stationary for a long period of time after kneading, in some cases, this leads to a problem of separation or reaggregation in the suspension. Accordingly, a pipe or an apparatus for supplying a suspension to a coating apparatus is preferably configured such that the slurry is not held for a long period of time.

With the kneading apparatus disclosed in Patent document 2, the preliminary kneading unit coarsely kneads the materials by batch kneading. This requires a manual operation in the manufacturing of the slurry as described above. In addition, the materials and the slurry are exposed to the atmosphere, which leads to the potential to involve degradation in the quality of the slurry.

The present invention has been made in order to solve the aforementioned problem. Accordingly, it is a purpose of the present invention to suppress the occurrence of separation and reaggregation in a suspension such as a battery electrode slurry or the like. Furthermore, it is a purpose of the present invention to provide stability of slurry quality and fully automated slurry manufacturing.

Means to Solve the Problem

In order to solve the aforementioned problems, the present invention proposes the following items. It should be noted that, for ease of understanding, description will be made with reference to reference symbols that correspond to the embodiments of the present invention. However, the present invention is not restricted to the embodiments.

(1) The present invention proposes a battery electrode slurry distributing apparatus (which corresponds to the battery electrode slurry distributing apparatus 1 shown in FIG. 1, for example) that distributes a battery electrode slurry to multiple coating units (which correspond to the coaters 91 and 92 shown in FIG. 3, for example) each configured to coat a metal sheet (which corresponds to the collector body described later, for example) used to manufacture a battery electrode with the battery electrode slurry, the battery electrode slurry distributing apparatus comprises: a circulation unit (which corresponds to the circulation pipe 14 shown in FIG. 3, for example) connected to multiple connection units (which correspond to the pipes 12 and 13 shown in FIG. 3, for example) respectively connected to the multiple coating units, and configured to circulate a battery electrode slurry in a state in which a pressure is applied to the battery electrode slurry; and a control unit (which corresponds to the control unit 70 shown in FIG. 3, for example) that controls a supply of the battery electrode slurry circulated via the circulation unit to each of the multiple coating units. In a period in which any one from among the multiple coating units is allowed to receive the supply of the battery electrode slurry, the control unit inhibits the supply of the battery electrode slurry to the remaining coating units other than the coating unit thus allowed to receive the supply of the battery electrode slurry.

With the present invention, the battery electrode slurry is circulated by a circulation unit. That is to say, the battery electrode slurry is circulated through the circulation unit. This allows the time during which the positive electrode slurry remains stationary to be reduced. This is capable of suppressing the occurrence of separation or reaggregation in the battery electrode slurry.

Furthermore, with the present invention, in a period in which any one from among the multiple coating units is allowed to receive the supply of the battery electrode slurry, the control unit inhibits the supply of the battery electrode slurry to the remaining coating units other than the coating unit thus allowed to receive the supply of the battery electrode slurry. Accordingly, only a single one from among the multiple coating units is allowed to receive the supply of the battery electrode slurry from the circulation unit at the same time. Accordingly, the pressurized battery electrode slurry is by no means supplied to the multiple coating units in a distributed manner. Rather, the pressurized battery electrode slurry is supplied to only a single coating unit in a concentrated manner. In a case in which the battery electrode slurry is supplied to the multiple coating units at the same time, this arrangement has the potential to involve a problem in that the flow speed of the circulated battery electrode slurry greatly falls depending on the consumption of the battery electrode slurry circulated via the circulation unit. In some cases, this leads to a problem in that the positive electrode slurry remains stationary. In order to solve this problem, this arrangement requires increased pressure to be applied to the battery electrode slurry. In contrast, with the aforementioned arrangement in which the battery electrode slurry is supplied to a single coating unit in a concentrated manner, this arrangement prevents the flow speed of the battery electrode slurry circulated through the circulation unit from greatly falling. Accordingly, this arrangement does not require such increased pressure to be applied to the battery electrode slurry. Thus, this arrangement does not require large pressure to be applied to the battery electrode slurry as compared with an arrangement in which the battery electrode slurry is supplied to the multiple coating units at the same time. Furthermore, this arrangement is capable of supplying the battery electrode slurry to each of the multiple coating units in a short period of time.

Furthermore, with the present invention, the multiple coating units are connected to the circulation unit via the multiple connection units. This allows multiple manufacturing lines to manufacture battery electrodes using the same battery electrode slurry. This provides improved uniformity of the quality of the battery electrodes. Furthermore, this arrangement is capable of operating one from among the coating units so as to continue the manufacturing of the battery electrodes while suspending the operations of the remaining coating units, thereby allowing the user to perform cleaning or maintenance for the remaining coating units in a simple manner.

(2) The present invention proposes a battery electrode slurry distributing apparatus described in (1). Also, the circulation unit may be structured in a polygonal loop. Also, the multiple connection units may be coupled to respective multiple elbow portions (which correspond to the elbow portions 141 shown in FIG. 5, for example) formed in the circulation unit.

With the present invention, in the battery electrode slurry distributing apparatus described in (1), the circulation unit is structured in a polygonal loop. Furthermore, multiple connection units are connected to elbow portions of the circulation unit. This arrangement weakens the flow of the battery electrode slurry at each elbow portion. This allows the battery electrode slurry flowing through the circulation unit to easily flow into the connection units. Accordingly, this arrangement is capable of supplying the battery electrode slurry to the coating units via the connection units without involving a complicated control operation.

(3) The present invention proposes a battery electrode slurry distributing apparatus described in (1) or (2). Also, the control unit may comprise openable/closable valves (which correspond to the two-way valves 71 and 72 shown in FIG. 3, for example) each of which controls a flow of the battery electrode slurry at a corresponding one of the multiple connection units. Also, the control unit may control the multiple valves such that two or more valves are not opened at the same time.

With the present invention, in the battery electrode slurry distributing apparatus described in (1) or (2), the control unit is provided with multiple valves. The multiple valves allow the flow of the battery electrode slurry to be controlled for each of the multiple connection units. This arrangement is capable of controlling the open/closed state of each valve, thereby allowing the supply amount of the battery electrode slurry to each of the multiple coating units to be independently controlled.

Furthermore, with the present invention, in the battery electrode slurry distributing apparatus described in (1) or (2), the multiple valves are controlled such that two or more valves are not opened at the same time. With this arrangement, from among the multiple coating units, only a single coating unit is allowed to receive the supply of the battery electrode slurry from the circulation unit at the same time. Accordingly, this arrangement requires only small pressure to be applied to the battery electrode slurry. Furthermore, this arrangement is capable of supplying the battery electrode slurry to each of the multiple coating units in a short period of time.

(4) The present invention proposes a battery electrode slurry distributing apparatus described in any one of (1) through (3). Also, the multiple connection units may include multiple first storage units (which correspond to the storage tanks 911 shown in FIG. 5, for example) each connected to a bottom face of the corresponding connection unit. Also, the multiple first storage units may each store the battery electrode slurry that flows to a corresponding one of the multiple connection units.

With the present invention, in the battery electrode slurry distributing apparatus described in any one of (1) through (3), the multiple connection units are each connected to the bottom face of the corresponding one of the multiple first storage units. The multiple first storage units each store the battery electrode slurry that flows through the corresponding one of the multiple connection units. With this arrangement, the battery electrode slurry is supplied to each first storage unit via the corresponding connection unit such that it gushes upward in the vertical direction. Accordingly, this arrangement is capable of preventing the battery electrode slurry from falling on the bottom face of the first storage unit and from falling on the battery electrode slurry already stored in the first storage unit as compared with an arrangement in which the battery electrode slurry is supplied from the upper side of the first storage unit. Accordingly, this arrangement is capable of preventing the battery electrode slurry from containing bubbles due to high-speed collision of the battery electrode slurry thus supplied with the bottom face of the first storage unit or otherwise the stored battery electrode slurry.

(5) The present invention proposes a battery electrode slurry distributing apparatus described in any one of (1) through (4). Also, the battery electrode slurry distributing apparatus may comprise a removing unit (which corresponds to the defoaming unit 31 or the filter 41 shown in FIG. 3, for example) that removes impurities contained in the battery electrode slurry circulated through the circulation unit.

With the present invention, in the battery electrode slurry distributing apparatus described in any one of (1) through (4), by providing the removing unit, this arrangement is capable of removing impurities contained in the battery electrode slurry circulated via the circulation unit. This provides improved quality of the battery electrode slurry.

(6) The present invention proposes a battery electrode slurry distributing apparatus described in any one of (1) through (5). Also, the battery electrode slurry distributing apparatus may comprise a second storage unit (which corresponds to the tank 21 shown in FIG. 3, for example) configured to store the battery electrode slurry circulated through the circulation unit, and to supply the battery electrode slurry thus stored to the circulation unit.

With the present invention, in the battery electrode slurry distributing apparatus described in any one of (1) through (5), by providing the second storage unit, this arrangement is capable of storing the battery electrode slurry circulated via the circulation unit, and of supplying the battery electrode slurry thus stored to the circulation unit. This arrangement allows the battery electrode slurry to be mixed in the second storage unit. This allows variation of the quality of the battery electrode slurry to be reduced, thereby providing improved uniformity of the quality of the battery electrode slurry.

Even if an increase or otherwise a reduction has occurred in the battery electrode slurry supplied to the circulation unit, the second storage unit allows a stable amount of the battery electrode slurry to be supplied to each coating unit. Specifically, when the amount of the battery electrode slurry that is being supplied to the circulation unit is smaller than the sum total of those required for the multiple coating units, the deficiency can be compensated for by the battery electrode slurry stored in the second storage unit. Conversely, when the amount of the battery electrode slurry that is being supplied to the circulation unit is larger than the sum total of those required for the multiple coating units, the excess can be stored in the second storage unit.

(7) The present invention proposes a battery electrode slurry distributing apparatus described in any one of (1) through (6). Also, the battery electrode slurry distributing apparatus may comprise a disposal unit (which corresponds to the disposal unit 81 shown in FIG. 6, for example) that is capable of selectively performing disposal of at least a part of the battery electrode slurry circulated through the circulation unit.

With the present invention, in the battery electrode slurry distributing apparatus described in any one of (1) through (6), by providing the disposal unit, this arrangement is capable of performing selective disposal of at least a part of the battery electrode slurry circulated through the circulation unit. This arrangement is capable of performing a disposal operation in a simple manner for the positive electrode slurry that could have degraded due to long-time circulation via the circulation unit.

(8) The present invention proposes a battery electrode slurry forming apparatus comprising: the battery electrode slurry distributing apparatus described in any one of (1) through (7); and a battery electrode slurry forming apparatus (which corresponds to the battery electrode slurry forming apparatus 100 shown in FIG. 1, for example) connected to the battery electrode slurry distributing apparatus, and configured to form a battery electrode slurry to be supplied to the battery electrode slurry distributing apparatus. The battery electrode slurry forming apparatus is arranged at a position that is higher than that of the battery electrode slurry distributing apparatus.

With the present invention, the battery electrode slurry forming apparatus is arranged at a position that is higher than that of the battery electrode slurry distributing apparatus described in any one of (1) through (7). With this arrangement, the battery electrode slurry is transferred downward in the vertical direction using gravity, from the battery electrode slurry forming apparatus to the battery electrode slurry distributing apparatus. Accordingly, the battery electrode slurry can be easily supplied from the battery electrode slurry forming apparatus to the battery electrode slurry distributing apparatus even if the battery electrode slurry has high viscosity.

(9) The present invention proposes a battery electrode slurry distributing method employed in a battery electrode slurry distributing apparatus (which corresponds to the battery electrode slurry distributing apparatus 1 shown in FIG. 1, for example) configured to distribute a battery electrode slurry to multiple coating units (which correspond to the coaters 91 and 92 shown in FIG. 3, for example) each configured to coat a metal sheet (which corresponds to the collector body described later, for example) used to manufacture a battery electrode with the battery electrode slurry. The battery electrode slurry distributing method comprises: a first step in which a battery electrode slurry is circulated through the circulation unit (which corresponds to the circulation pipe 14 shown in FIG. 3, for example) connected to the multiple coating units in a state in which a pressure is applied to the battery electrode slurry; and a second step in which a supply of the battery electrode slurry circulated in the first step to each of the multiple coating units is controlled. In the second step, in a period in which any one from among the multiple coating units is allowed to receive the supply of the battery electrode slurry, the supply of the battery electrode slurry to the remaining coating units other than the coating unit thus allowed to receive the supply of the battery electrode slurry is inhibited.

With the present invention, this arrangement is capable of providing the same advantages as described above.

(10) The present invention proposes a suspension distributing apparatus that distributes a suspension to multiple manufacturing units each configured to manufacture a target product using the suspension. The suspension distributing apparatus comprises: a circulation unit connected to the multiple manufacturing units, and configured to circulate a suspension in a state in which a pressure is applied to the suspension; and a control unit that controls a supply of the suspension circulated via the circulation unit to each of the multiple manufacturing units. In a period in which any one from among the multiple manufacturing units is allowed to receive the supply of the suspension, the control unit inhibits the supply of the suspension to the remaining manufacturing units other than the manufacturing unit thus allowed to receive the supply of the suspension.

With the present invention, the suspension is circulated by the circulation unit. Accordingly, the suspension is circulated through the circulation unit. Accordingly, this arrangement allows the time for which the suspension remains stationary to be reduced. This is capable of suppressing the occurrence of separation or reaggregation in the suspension.

Furthermore, with the present invention, in a period in which any one from among the multiple manufacturing units is allowed to receive the supply of the suspension, the control unit inhibits the supply of the suspension to the remaining manufacturing units other than the manufacturing unit thus allowed to receive the supply of the suspension. Accordingly, only a single one from among the multiple manufacturing units is allowed to receive the supply of the suspension from the circulation unit at the same time. Accordingly, the pressurized suspension is by no means supplied to the multiple manufacturing units in a distributed manner. Rather, the pressurized suspension is supplied to only a single manufacturing unit in a concentrated manner. In a case in which the suspension is supplied to the multiple manufacturing units at the same time, this arrangement has the potential to involve a problem in that the flow speed of the suspension greatly falls depending on the consumption of the suspension circulated via the circulation unit. In some cases, this leads to a problem in that the positive electrode slurry remains stationary. In order to solve this problem, this arrangement requires increased pressure to be applied to the suspension. In contrast, with the aforementioned arrangement in which the suspension is supplied to a single manufacturing unit in a concentrated manner, this arrangement prevents the flow speed of the suspension circulated through the circulation unit from greatly falling. Accordingly, this arrangement does not require such increased pressure to be applied to the suspension. Thus, this arrangement does not require large pressure to be applied to the suspension as compared with an arrangement in which the suspension is supplied to the multiple manufacturing units at the same time. Furthermore, this arrangement is capable of supplying the suspension to each of the multiple manufacturing units in a short period of time.

Furthermore, with the present invention, the multiple manufacturing units are connected to the circulation unit via the multiple connection units. This allows multiple manufacturing lines to manufacture target products using the same suspension. This provides improved uniformity of the quality of the target products. Furthermore, this arrangement is capable of operating one from among the manufacturing units so as to continue the manufacturing of the target products while suspending the operations of the remaining manufacturing units, thereby allowing the user to perform cleaning or maintenance for the remaining manufacturing units in a simple manner.

(11) The present invention proposes a suspension distributing method employed in a suspension distributing apparatus that distributes a suspension to multiple manufacturing units each configured to manufacture a target product using the suspension. The suspension distributing method comprises: a first step in which, in a circulation unit connected to the multiple manufacturing units, a suspension is circulated in a state in which a pressure is applied to the suspension; and a second step in which a supply of the suspension circulated in the first step to each of the multiple manufacturing units is controlled. In the second step, in a period in which any one from among the multiple manufacturing units is allowed to receive the supply of the suspension, the supply of the suspension to the remaining manufacturing units other than the manufacturing unit thus allowed to receive the supply of the suspension is inhibited.

With the present invention, this arrangement is capable of providing the same advantages as described above.

(12) The present invention proposes a battery electrode slurry processing apparatus (which corresponds to the battery electrode slurry processing apparatus 1000 shown in FIG. 7, for example) that forms a battery electrode slurry (which corresponds to the positive electrode slurry described later, for example) and performs coating with the battery electrode slurry. The battery electrode slurry processing apparatus comprises: a first supply unit (which corresponds to the binder supply unit 1100, the positive electrode material supply unit 1200, and the conductive additive supply unit 1300 shown in FIG. 7, for example) that supplies multiple materials (which correspond to the binder, the positive-electrode active material, and the conductive additive described later, for example) to be used to form the battery electrode slurry; a first transfer unit (which corresponds so the pipes 2100, 2200, and 2300 shown in FIG. 7, for example) that transfers the multiple materials supplied from the first supply unit; a first kneading unit (which corresponds to the preliminary kneading unit 1400 shown in FIG. 7 or the preliminary kneading unit 1140 shown in FIG. 18, for example) that kneads the multiple materials transferred by the first transfer unit, and that continuously discharges the kneaded materials; a second transfer unit (which corresponds to the pipes 2400 and 2500 shown in FIG. 7, for example) that transfers the materials discharged from the first kneading unit; a circulation unit (which corresponds to the circulation pipe 2800 shown in FIG. 7, for example) that circulates the materials transferred by the second transfer unit; a coating unit (which corresponds to the coaters 1910 and 1920 shown in FIG. 7, for example) comprising a storage unit (which corresponds to the storage tank 1911 shown in FIG. 13, for example) connected to the circulation unit so as to store a part of the materials circulated by the circulation unit, and configured to coat a battery sheet (which corresponds to the collector body described later, for example) with the materials stored in the storage unit; and a pressure-applying unit (which corresponds to the Mohno pumps 5100 and 7300, the preliminary kneading unit 1400, and the main kneading unit 1500 shown in FIG. 7, for example) that applies a pressure to at least one from among the materials transferred by the first transfer unit, the materials transferred by the second transfer unit, and the materials circulated by the circulation unit. A closed space is defined by the first supply unit, the first transfer unit, the first kneading unit, the second transfer unit, the circulation unit, and the storage unit such that they communicate with each other. A space control unit (which corresponds to the space control unit 3100 shown in FIG. 7, for example) is further provided so as to control the space such that a pressure of the space is reduced or otherwise such that the space is filled with an inert gas.

With the present invention, a closed space is defined by the first supply unit, the first transfer unit, the first kneading unit, the second transfer unit, the circulation unit, and the storage unit of the coating unit such that they communicate with each other. Furthermore, the space control unit sets the space to a state in which the pressure thereof is reduced or otherwise a state in which the space is filled with an inert gas. This arrangement is capable of suppressing exposure of the materials and the battery electrode slurry to the atmosphere over a period from a step in which the materials are fed to the first supply unit up to a step in which an electrode sheet is coated with the battery electrode slurry stored in the storage unit. Accordingly, this provides improved stability of the quality of the battery electrode slurry. Furthermore, this arrangement allows the coating unit to perform stable coating processing regardless of the state of the positive electrode slurry thus formed.

Furthermore, the materials kneaded by the first kneading unit are circulated by the circulation unit in a period before they are stored in the storage unit of the coating unit after they are transferred by the second transfer unit. This arrangement allows the flow of the battery electrode slurry to be maintained over the aforementioned period. This is capable of preventing the occurrence of separation or reaggregation in the battery electrode slurry. This prevents degradation in the quality of the battery electrode slurry.

Furthermore, the pressure-applying unit applies pressure to at least one from among the materials transferred by the first transfer unit, the materials transferred by the second transfer unit, and the materials circulated by the circulation unit. With this arrangement, the materials to be supplied to each unit or otherwise to be discharged from each unit are transferred in the battery electrode slurry processing apparatus by the pressure applied by the pressure-applying unit. Accordingly, this arrangement provides fully automated battery electrode slurry manufacturing.

(13) The present invention proposes a battery electrode slurry processing apparatus described in (12). Also, the sum total of amounts of the multiple materials supplied by the first supply unit per unit of time may be designed to be equal to an amount of the materials discharged from the first kneading unit per unit of time.

When the sum total of the amounts of the multiple materials supplied from the first supply unit per unit of time is smaller than that discharged from the first kneading unit per unit of time, this leads to a deficiency of materials to be kneaded by the first kneading unit, resulting in a time in which the first kneading unit cannot discharge the materials. This leads to a problem in that the continuous supply of the materials to the coating unit cannot be maintained.

Conversely, when the sum total of the amounts of the multiple materials supplied from the first supply unit per unit of time is larger than that discharged from the first kneading unit per unit of time, this leads to a problem in that at least a part of the multiple materials supplied from the first supply unit remains stationary in at least one from among the first transfer unit and the first kneading unit.

In order to solve such a problem, the battery electrode slurry processing apparatus described in (12) is designed such that the sum total of the multiple materials supplied from the first supply unit per unit of time is equal to that discharged from the first kneading unit per unit of time. Accordingly, this arrangement is capable of continuously transferring the multiple materials supplied from the first supply unit to the coating unit without being retained in either the first transfer unit or the first kneading unit.

(14) The present invention proposes a battery electrode slurry processing apparatus described in (12) or (13). Also, the first supply unit may comprise multiple auxiliary first supply units (which correspond to the binder supply unit 1100, the positive electrode material supply unit 1200, and the conductive additive supply unit 1300 shown in FIG. 7, for example) that each supply a corresponding one of the multiple materials. Also, the first transfer unit may comprise multiple auxiliary first transfer units (which correspond to the pipes 2100, 2200, and 2300 shown in FIG. 7, for example) that each transfer a corresponding one of the multiple materials supplied from the multiple auxiliary first supply units.

With the present invention, in the battery electrode slurry processing apparatus described in (12) or (13), the first supply unit is provided with multiple auxiliary first supply units each configured to supply a corresponding one of the multiple materials. Furthermore, the first transfer unit is provided with multiple auxiliary first transfer units each configured to transfer a corresponding one of the multiple materials supplied from the multiple auxiliary first supply units. This allows the multiple materials to be supplied at matched timings to the first kneading unit via different respective auxiliary first supply units and different respective auxiliary first transfer units.

(15) The present invention proposes a battery electrode slurry processing apparatus described in (14). Also, the pressure-applying unit may apply a pressure to at least one from among the materials transferred by the multiple auxiliary first transfer units, the materials transferred by the second transfer unit, and the materials circulated by the circulation unit.

With the present invention, the battery electrode slurry processing apparatus described in (14) is designed such that the pressure-applying unit applies pressure to at least one from among the materials transferred by at least one from among the multiple auxiliary first transfer units, the materials transferred by the second transfer unit, and the materials circulated by the circulation unit. With this arrangement, the materials to be supplied to each unit or otherwise to be discharged from each unit are transferred in the battery electrode slurry processing apparatus by the pressure applied by the pressure-applying unit. Thus, this arrangement provides the same advantages as those described above.

(16) The present invention proposes a battery electrode slurry processing apparatus described in any one of (12) through (15). Also, the second transfer unit may comprise an inlet (which corresponds to the inlet 2410 shown in FIG. 7, for example) configured to receive the materials discharged from the first kneading unit so as to transfer the materials thus received, and an outlet (which corresponds to the outlet 2510 shown in FIG. 7, for example) configured to discharge the materials transferred via the inlet. Also, the second transfer unit may further comprise a second kneading unit (which corresponds to the main kneading unit 1500 shown in FIG. 1, for example) arranged between the inlet and the outlet, and configured to knead the materials transferred from the inlet, and to continuously discharge the materials thus kneaded toward the outlet.

With the present invention, in the battery electrode slurry processing apparatus described in any one of (12) through (15), the second kneading unit is arranged between the inlet and the outlet of the second transfer unit. The second kneading unit kneads the materials transferred from the inlet, and continuously discharges the materials thus kneaded toward the outlet. With this arrangement, the materials kneaded by the first kneading unit can be further kneaded by the second kneading unit.

(17) The present invention proposes a battery electrode slurry processing apparatus described in any one of (12) through (15). Also, the battery electrode slurry processing apparatus may comprise a plurality of the first kneading units. Also, the multiple first kneading units may be arranged in parallel.

With the present invention, in the battery electrode slurry processing apparatus described in any one of (12) through (15), multiple first kneading units are provided and arranged in parallel. With this arrangement, each first kneading unit can be independently operated as appropriate according to the target amount of the battery electrode slurry to be formed or a maintenance operation such as cleaning or the like. Specifically, even if the operation is suspended for one from among the multiple first kneading units in order to allow the user to perform cleaning, this arrangement is capable of continuing the kneading operation by the remaining first kneading units, thereby allowing the supply of the materials to the coating unit to be continued.

(18) The present invention proposes a battery electrode slurry processing apparatus described in (16). Also, there may be a plurality of at least one from among the first kneading units and the second kneading units. In a case in which there is a plurality of the first kneading units, the multiple first kneading units may be arranged in parallel. In a case in which there is a plurality of the second kneading units, the multiple second kneading units may be arranged in parallel. Also, each of the first kneading units and each of the second kneading units may be independently controlled such that the sum total of throughputs of the first kneading units is equal to the sum total of throughputs of the second kneading units.

With the present invention, in the battery electrode slurry processing apparatus described in (16), a plurality of at least one from among the first kneading units and the second kneading units is provided. In a case in which there is a plurality of the first kneading units, the multiple first kneading units are arranged in parallel. In a case in which there is a plurality of the second kneading units, the multiple second kneading units are arranged in parallel. Furthermore, each of the first kneading units and each of the second kneading units are independently controlled such that the sum total of throughputs of the first kneading units is equal to the sum total of throughputs of the second kneading units. With this arrangement, each first kneading unit and each second kneading unit can be independently operated as appropriate according to the target amount of the battery electrode slurry to be formed or a maintenance operation such as cleaning or the like while continuously supplying the materials kneaded by the first kneading units to the second kneading units. Specifically, even if the operation is suspended for one from among the multiple first kneading units in order to allow the user to perform cleaning of the first kneading unit thus selected, this arrangement is capable of continuing the kneading operation by the remaining first kneading units, thereby continuing the supply of the materials to each second kneading unit. Also, even if the operation is suspended for one from among the multiple second kneading units in order to allow the user to perform cleaning of the second kneading unit thus selected, this arrangement is capable of continuing the kneading operation by the remaining second kneading units, thereby continuing the manufacturing of the battery electrode slurry.

When the throughput of the first kneading units is smaller than that of the second kneading units, this leads to a deficiency of the materials to be kneaded by the second kneading units, resulting in the occurrence of a time in which each second kneading unit cannot discharge the materials. This leads to a problem in that each second kneading unit cannot continuously discharge the kneaded materials.

Conversely, when the throughput of the first kneading units is larger than that of the second kneading units, this leads to a problem in that at least a part of the materials discharged from the first kneading units remains stationary in at least one from among the second transfer unit and the second kneading units.

In order to solve such a problem, the battery electrode slurry processing apparatus described in (16) is designed such that the sum total of the throughputs of the first kneading units is equal to that of the second kneading units. Accordingly, this arrangement is capable of continuously discharging the materials kneaded by the second kneading units from the second kneading units without the retention of the materials discharged from the first kneading units in either the second transfer unit or any second kneading unit.

(19) The present invention proposes a battery electrode slurry processing apparatus described in (16) or (18). Also, the first supply unit may supply at least an active material (which corresponds to the positive-electrode active material described later, for example) and a binder agent (which corresponds to the binder described later, for example) as the multiple materials. Also, the first kneading unit may perform coarse kneading of the multiple materials. Also, the second kneading unit may perform main kneading of the materials transferred by the second transfer unit.

With the present invention, in the battery electrode slurry processing apparatus described in (16) or (18), as the multiple materials, at least an active material and a binder agent are supplied by the first supply unit. The multiple materials are subjected to coarse kneading by the first kneading unit. The materials transferred by the second kneading unit are subjected to main kneading by the second kneading unit. The materials are handled such that they are not exposed to the atmosphere before they are applied by the coating unit. This arrangement is capable of manufacturing battery electrodes each configured as an electrode sheet coated with a high-quality battery electrode slurry.

(20) The present invention proposes a battery electrode slurry processing method employed in a battery electrode slurry processing apparatus (which corresponds to the battery electrode slurry processing apparatus 1000 shown in FIG. 7, for example) that forms a battery electrode slurry (which corresponds to the positive electrode slurry described later, for example) and performs coating with the battery electrode slurry. The battery electrode slurry processing method comprises: a first step in which multiple materials (which correspond to the binder, the positive-electrode active material, and the conductive additive described later, for example) to be used to form the battery electrode slurry are supplied; a second step in which the multiple materials supplied in the first step are transferred; a third step in which the multiple materials transferred in the second step are kneaded, and the materials thus kneaded are continuously discharged; a fourth step in which the materials discharged in the third step are transferred; a fifth step in which the materials transferred in the fourth step are circulated; a sixth step in which a part of the materials circulated in the fifth step is stored, and an electrode sheet is coated with the materials thus stored; and a seventh step in which a pressure is applied to at least one from among the materials transferred in the second step, the materials transferred in the fourth step, and the materials circulated in the fifth step. A closed space is defined by combining a space in which the first step is performed, a space in which the second step is performed, a space in which the third step is performed, a space in which the fourth step is performed, a space in which the fifth step is performed, and a space in which the materials are stored in the sixth step. The battery electrode slurry processing method further comprises an eighth step in which the space is controlled such that a pressure of the space is reduced or otherwise such that the space is filled with an inert gas.

With the present invention, this arrangement is capable of providing the same advantages as described above.

(21) The present invention proposes a manufacturing apparatus (which corresponds to the manufacturing apparatus 1000A shown in FIG. 14, for example) that manufactures a target product using multiple mixed materials. The manufacturing apparatus comprises: a first supply unit (which corresponds to the first material supply unit 1100A, the second material supply unit 1200A, and the third material supply unit 1300A shown in FIG. 14, for example) that supplies the multiple materials; a first transfer unit (which corresponds to the pipes 2100, 2200, and 2300 shown in FIG. 14, for example) that transfers the multiple materials supplied from the first supply unit; a first mixing unit (which corresponds to the preliminary mixing unit 1400A shown in FIG. 14 or the mixing unit 1140A shown in FIG. 19, for example) that mixes the multiple materials transferred from the first transfer unit, and that continuously discharges the multiple materials thus mixed; a second transfer unit (which corresponds to the pipes 2400 and 2500 shown in FIG. 14, for example) that transfers the materials discharged from the first mixing unit; a circulation unit (which corresponds to the circulation pipe 2800 shown in FIG. 14, for example) that circulates the materials transferred by the second transfer unit; a manufacturing unit (which corresponds to the coaters 1910 and 1920 shown in FIG. 14, for example) comprising a storage unit connected to the circulation unit so as to store a part of the materials circulated by the circulation unit, and configured to manufacture the target product using the materials stored in the storage unit; and a pressure-applying unit (which corresponds to the Mohno pumps 5100 and 7300, the preliminary mixing unit 1400A, and the main mixing unit 1500A shown in FIG. 14, for example) that applies a pressure to at least one from among the materials transferred by the first transfer unit, the materials transferred by the second transfer unit, and the materials circulated by the circulation unit. A closed space is defined by the first supply unit, the first transfer unit, the first mixing unit, the second transfer unit, the circulation unit, and the storage unit such that they communicate with each other. The manufacturing apparatus further comprises a space control unit (which corresponds to the space control unit 3100 shown in FIG. 14, for example) that controls the aforementioned space such that a pressure of the space is reduced or otherwise such that the space is filled with an inert gas.

With the present invention, a closed space is defined by the first supply unit, the first transfer unit, the first kneading unit, the second transfer unit, the circulation unit, and the storage unit of the manufacturing unit such that they communicate with each other. Furthermore, the space control unit sets the space to a state in which the pressure thereof is reduced or otherwise a state in which the space is filled with an inert gas. This arrangement is capable of suppressing the exposure of the materials and the slurry to the atmosphere over a period from a step in which the materials are fed to the first supply unit up to a step in which a target product is manufactured using the slurry stored in the storage unit. Accordingly, this provides improved stability of the quality of the slurry. Furthermore, this arrangement allows the manufacturing unit to perform stable manufacturing regardless of the manufacturing situation of the slurry.

Furthermore, the materials kneaded by the first kneading unit are circulated by the circulation unit in a period before they are stored in the storage unit of the manufacturing unit after they are transferred by the second transfer unit. This arrangement allows the flow of the slurry to be maintained over the aforementioned period. This is capable of preventing the occurrence of separation or reaggregation in the slurry. This prevents degradation in the quality of the slurry.

Furthermore, the pressure-applying unit applies pressure to at least one from among the materials transferred by the first transfer unit, the materials transferred by the second transfer unit, and the materials circulated by the circulation unit. With this arrangement, the materials to be supplied to each unit or otherwise to be discharged from each unit are transferred in the manufacturing apparatus by the pressure applied by the pressure-applying unit. Accordingly, this arrangement provides fully automated slurry manufacturing.

(22) The present invention proposes a manufacturing apparatus described in (21). Also, a plurality of the first mixing units may be provided. Also, the multiple first mixing units may be arranged in parallel.

With the present invention, in the battery electrode slurry processing apparatus described in (21), multiple first kneading units are provided and arranged in parallel. With this arrangement, each first kneading unit can be independently operated as appropriate according to the target amount of the slurry to be formed or a maintenance operation such as cleaning or the like. Specifically, even if the operation is suspended for one from among the multiple first kneading units in order to allow the user to perform cleaning, this arrangement is capable of continuing the kneading operation by the remaining first kneading units, thereby allowing the supply of the materials to the manufacturing unit to be continued.

(23) The present invention proposes a manufacturing method employed in a manufacturing apparatus (which corresponds to the manufacturing apparatus 1000A shown in FIG. 14, for example) that manufactures a target product using multiple mixed materials. The manufacturing method comprises: a first step in which the multiple materials are supplied; a second step in which the multiple materials supplied in the first step are transferred; a third step in which the multiple materials transferred in the second step are mixed and are continuously discharged; a fourth step in which the materials discharged in the third step are transferred; a fifth step in which the materials transferred in the fourth step are circulated; a sixth step in which a part of the materials circulated in the fifth step is stored, and the target product is manufactured using the stored materials; and a seventh step in which a pressure is applied to at least one from among the materials transferred in the second step, the materials transferred in the fourth step, and the materials circulated in the fifth step. A closed space is defined by combining a space in which the first step is performed, a space in which the second step is performed, a space in which the third step is performed, a space in which the fourth step is performed, a space in which the fifth step is performed, and a space in which the materials are stored in the sixth step. The manufacturing method further comprises an eighth step in which the space is set to a state in which a pressure of the space is reduced or otherwise a state in which the space is filled with an inert gas.

With the present invention, this arrangement is capable of providing the same advantages as described above.

Advantage of the Present Invention

With the present invention, this arrangement is capable of suppressing the occurrence of separation and reaggregation in a suspension such as a battery electrode slurry. Furthermore, with the present invention, this arrangement provides stability of the slurry quality and fully automated slurry manufacturing.

DESCRIPTION OF THE PREFERRED EMBODIMENTS

Detailed description will be made below regarding an embodiment of the present invention with reference to the drawings.

It should be noted that each component in the following embodiment can be replaced as appropriate by another existing component. Also, various kinds of variations may be made including various kinds of combinations with different existing components. Accordingly, description of the present embodiment is by no means intended to restrict the technical scope of the present invention described in the appended claims.

First Embodiment

Figure 1:
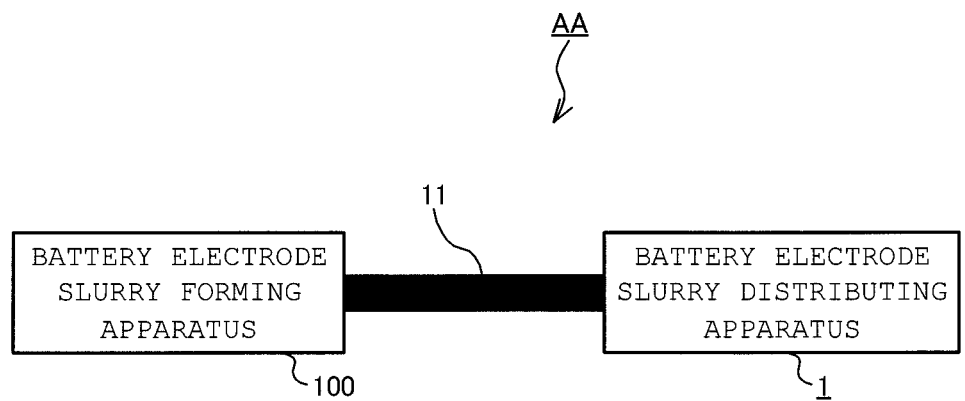
FIG. 1 is a configuration diagram showing a schematic configuration of a battery electrode slurry processing apparatus according to a first embodiment of the present invention.

FIG. 1 is a configuration diagram showing a schematic configuration of a battery electrode slurry processing apparatus AA according to a first embodiment of the present invention. The battery electrode slurry processing apparatus AA includes a battery electrode slurry forming apparatus 100, a pipe 11, and a battery electrode slurry distributing apparatus 1.

The battery electrode slurry forming apparatus 100 is installed at a position that is higher than that of the battery electrode slurry distributing apparatus 1, and forms a battery electrode slurry. The battery electrode slurry forming apparatus 100 is connected to the battery electrode slurry distributing apparatus 1 via the pipe 11. The battery electrode slurry formed by the battery electrode slurry forming apparatus 100 is supplied to the battery electrode slurry distributing apparatus 1 via the pipe 11. The battery electrode slurry distributing apparatus 1 distributes the battery electrode slurry supplied via the pipe 11.

Figure 2:
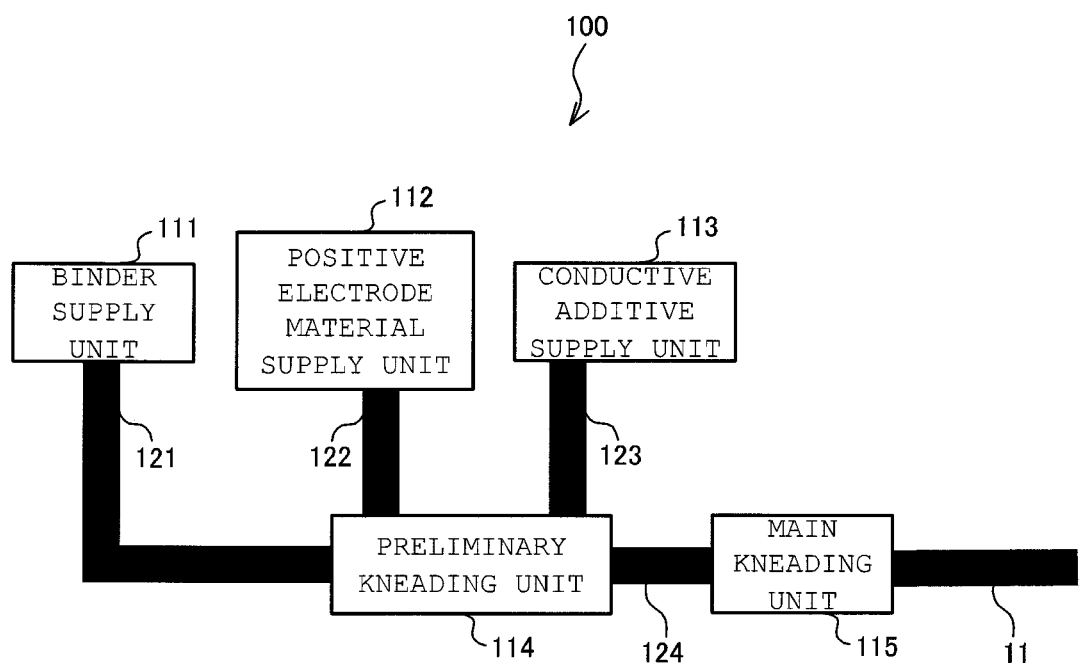
FIG. 2 is a configuration diagram showing a schematic configuration of a battery electrode slurry forming apparatus according to the first embodiment of the present invention.

FIG. 2 is a configuration diagram showing a schematic configuration of the battery electrode slurry forming apparatus 100. The battery electrode slurry forming apparatus 100 is an apparatus that forms a positive electrode slurry as the battery electrode slurry. The battery electrode slurry forming apparatus 100 includes a binder supply unit 111, a positive electrode material supply unit 112, a conductive additive supply unit 113, a preliminary kneading unit 114, a main kneading unit 115, and pipes 121, 122, 123, and 124.

The binder supply unit 111 is connected to the preliminary kneading unit 114 via the pipe 121, and supplies a binder to the preliminary kneading unit 114. The positive electrode material supply unit 112 is connected to the preliminary kneading unit 114 via the pipe 122, and supplies a positive-electrode active material to the preliminary kneading unit 114. The conductive additive supply unit 113 is connected to the preliminary kneading unit 114 via the pipe 123, and supplies a conductive additive (conductive auxiliary material) to the preliminary kneading unit 114.

The preliminary kneading unit 114 coarsely kneads the binder, the positive-electrode active material, and the conductive additive thus supplied, and outputs the mixture as a preliminary kneaded slurry to the pipe 124. The pipe 124 is connected to the main kneading unit 115. The preliminary kneaded slurry discharged from the preliminary kneading unit 114 is supplied to the main kneading unit 115 via the pipe 124.

The main kneading unit 115 carries out the main kneading of the preliminary kneaded slurry thus supplied, and supplies the mixture as a positive electrode slurry to the pipe 11.

Figure 3:
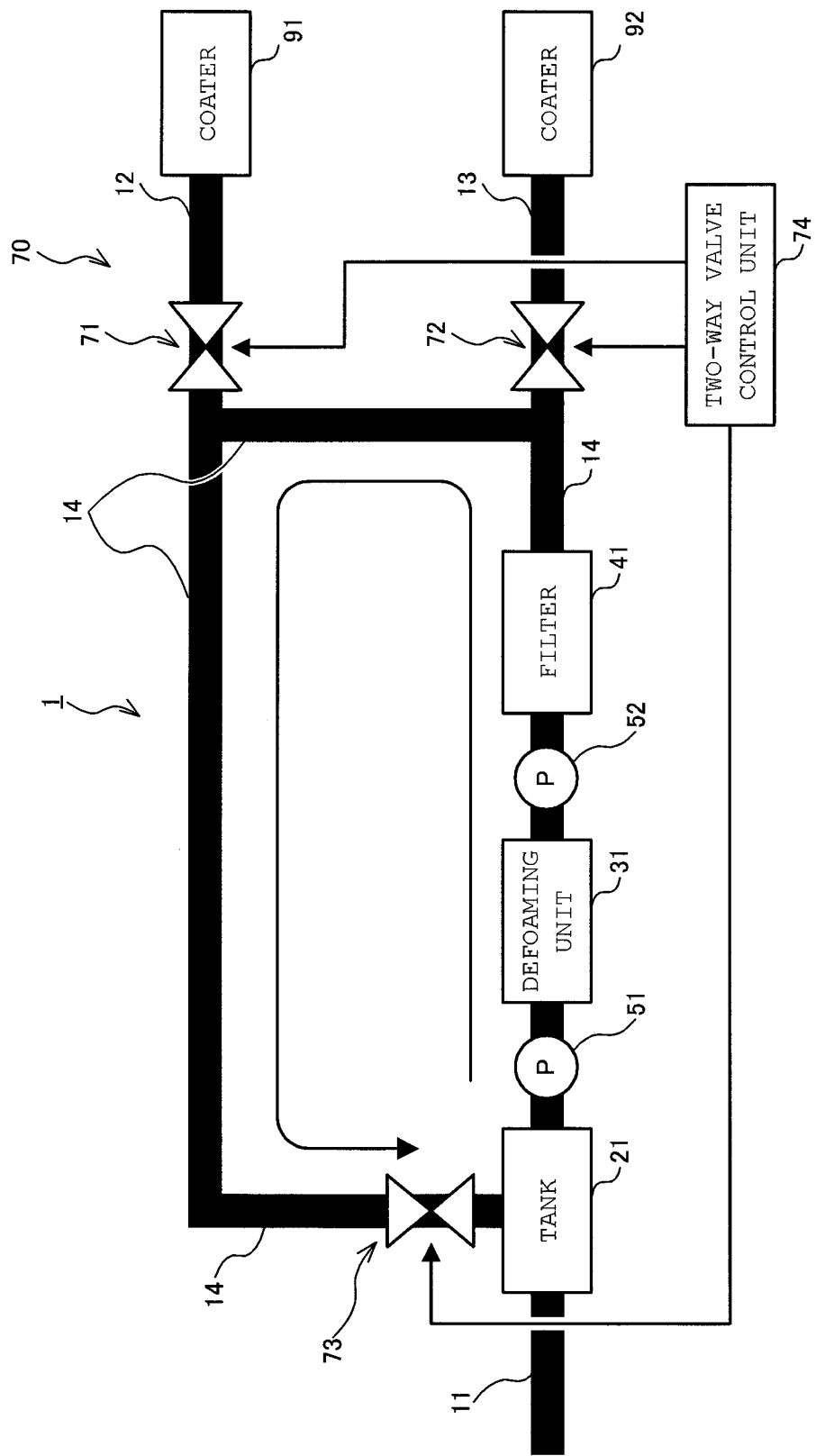
FIG. 3 is a configuration diagram showing a schematic configuration of a battery electrode slurry distributing apparatus according to the first embodiment of the present invention.

FIG. 3 is a configuration diagram showing a schematic configuration of the battery electrode slurry distributing apparatus 1. The battery electrode slurry distributing apparatus 1 includes pipes 12 and 13, a circulation pipe 14, a tank 21, a defoaming unit 31, a filter 41, Mohno pumps 51 and 52, a control unit 70, and coaters 91 and 92.

The pipe 11 is connected to the tank 21. The positive electrode slurry supplied from the battery electrode slurry forming apparatus 100 is supplied to the tank 21 via the pipe 11.

Furthermore, the circulation pipe 14 is connected to the tank 21. The circulation pipe 14 has a circular structure, and is configured to circulate the positive electrode slurry by pressure applied by the battery electrode slurry forming apparatus 100 and the Mohno pumps 51 and 52.

The tank 21 stores the positive electrode slurry supplied from the battery electrode slurry forming apparatus 100 via the pipe 11 and the positive electrode slurry circulated via the circulation pipe 14. Furthermore, the tank 21 continuously supplies the positive electrode slurry thus stored to the circulation pipe 14. Description will be made below with reference to FIG. 4 regarding an example of the configuration of the tank 21.

Figure 4:
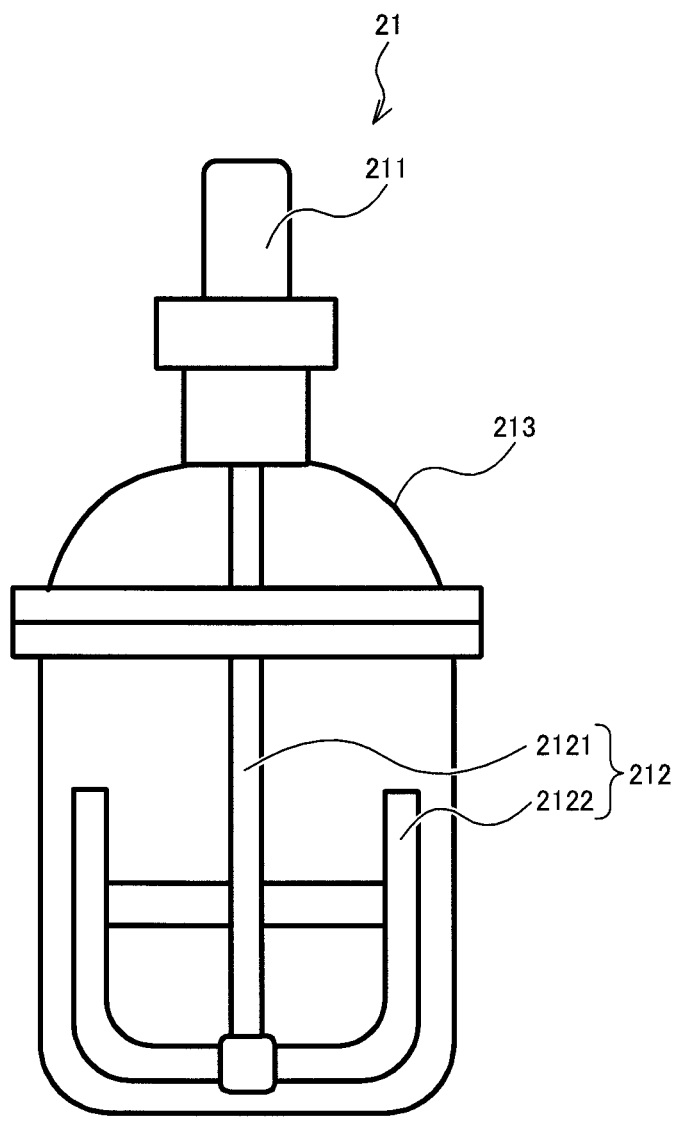
FIG. 4 is a cross-sectional diagram showing a schematic configuration of a tank included in the battery electrode slurry distributing apparatus according to the first embodiment of the present invention.

FIG. 4 is a cross-sectional diagram showing a schematic configuration of the tank 21. The tank 21 includes a motor 211, a stirrer 212, and a casing 213. The stirrer 212 is configured as a so-called anchor stirrer including a rotor shaft 2121 and stirring vanes 2122. The rotor shaft 2121 is rotationally driven by the motor 212 with the longitudinal center line of the rotor shaft 2121 as the axis of rotation. By rotationally driving the rotor shaft 2121, this arrangement rotationally drives the stirring vanes 2122. With the tank 21, by driving the motor 211 so as to rotationally drive the stirring vanes 2122, the positive electrode slurry thus stored is stirred. It should be noted that the positive electrode slurry is input to the internal space of the tank 21 via the inner wall of the tank 21 from an inlet (not shown) provided to the side wall of the tank 21. In a case in which the positive electrode slurry is input from the upper side of the tank 21, this arrangement has the potential to involve bubbles being contained in the slurry. The aforementioned arrangement is designed in order to avoid such a problem. Furthermore, the positive electrode slurry stored in the tank 21 is output via an outlet (not shown) provided to the bottom face of the tank 21. It should be noted that the internal space of the tank 21 is preferably filled with an inert gas. The pressure of the internal space of the tank 21 is controlled as appropriate according to the amount of the positive electrode slurry thus stored.

Returning to FIG. 3, the circulation pipe 14 is provided with the defoaming unit 31, the filter 41, and the Mohno pumps 51 and 52.

The Mohno pump 51 applies pressure to the positive electrode slurry supplied from the tank 21 to the circulation pipe 14 in a direction indicated by the arrow shown in FIG. 3.

The defoaming unit 31 performs a defoaming operation for the positive electrode slurry circulated via the circulation pipe 14, so as to remove bubbles contained in the positive electrode slurry circulated via the circulation pipe 14.

The Mohno pump 52 applies pressure in a direction indicated by the arrow shown in FIG. 3 to the positive electrode slurry that has been subjected to defoaming by the defoaming unit 31.

The filter 41 removes impurities contained in the positive electrode slurry circulated via the circulation pipe 14. Examples of such impurities to be removed by the filter 41 include aggregated clusters that have not been dispersed.

The circulation pipe 14 is connected to a pipe 12 connected to the coater 91 and a pipe 13 connected to the coater 92. The coaters 91 and 92 each coat a collector body with the positive electrode slurry after bubbles are removed by the defoaming unit 31 and impurities are removed by the filter 41. As a collector body, a sheet such as a metal foil having sufficient electrical conductivity may be employed. The material or the size thereof is not restricted in particular. Preferably, an aluminum foil or a copper foil may be employed.

The control unit 70 includes two-way valves 71, 72, and 73, and a two-way valve control unit 74. The two-way valve 71 is provided to the pipe 12 such that it is positioned in the vicinity of a connection that connects the pipe 12 and the circulation pipe 14. Upon opening the two-way valve 71, the positive electrode slurry is supplied from the circulation pipe 14 to the coater 91. Conversely, upon closing the two-way valve 71, the supply of the positive electrode slurry from the circulation pipe 14 to the coater is suspended. The two-way valve 72 is provided to the pipe 13 such that it is positioned in the vicinity of a connection node that connects the pipe 13 and the circulation pipe 14. Upon opening the two-way valve 72, the positive electrode slurry is supplied from the circulation pipe 14 to the coater 92. Conversely, upon closing the two-way valve 72, the supply of the positive electrode slurry from the circulation pipe 14 to the coater 92 is suspended. The two-way valve 73 is provided to the pipe 14 such that it is positioned in the vicinity of the inlet of the tank 21 to which the positive electrode slurry circulated via the circulation pipe 14 is to be supplied. Upon opening the two-way valve 73, the positive electrode slurry is supplied from the circulation pipe 14 to the tank 21. Conversely, upon closing the two-way valve 73, the supply of the positive electrode slurry from the circulation pipe 14 to the tank 12 is suspended.

The two-way valve control unit 74 controls the open/closed state for each of the two-way valves 71, 72, and such that two or more valves from among the two-way valves 71 and 72 are not opened at the same time. Detailed description will be made below regarding the control operation of the two-way valve control unit 74.

When the positive electrode slurry is to be supplied to neither the coater 91 nor the coater 92, the two-way valve control unit 74 closes the two-way valves 71 and 72, and opens the two-way valve 73. In this state, the positive electrode slurry that has passed through the filter 41 flows through neither the coater 91 nor the coater 92. Instead, the positive electrode slurry flows into the tank 21. In this case, the positive electrode slurry that has passed through the filter 41 is mixed in the tank 21 with the positive electrode slurry supplied from the battery electrode slurry forming apparatus 100 via the pipe 11. The electrode slurry thus mixed is circulated via the circulation pipe 14.

When the positive electrode slurry is to be supplied to the coater 91, the two-way control unit 74 opens the two-way valve 71, and closes the two-way valves 72 and 73. In this state, after the positive electrode slurry has passed through the filter 41, the positive electrode slurry flows to neither the coater 92 nor the tank 21. Instead, the positive electrode slurry flows to the coater 91.

When the positive electrode slurry is to be supplied to the coater 92, the two-way control unit 74 opens the two-way valve 72, and closes the two-way valves 71 and 73. In this state, after the positive electrode slurry has passed through the filter 41, the positive electrode slurry flows to neither the coater 91 nor the tank 21. Instead, the positive electrode slurry flows to the coater 92.

This arrangement allows the supply of the positive electrode slurry to one from among the coaters 91 and 92, and inhibits the supply of the positive electrode slurry to the other coater.

Figure 5:
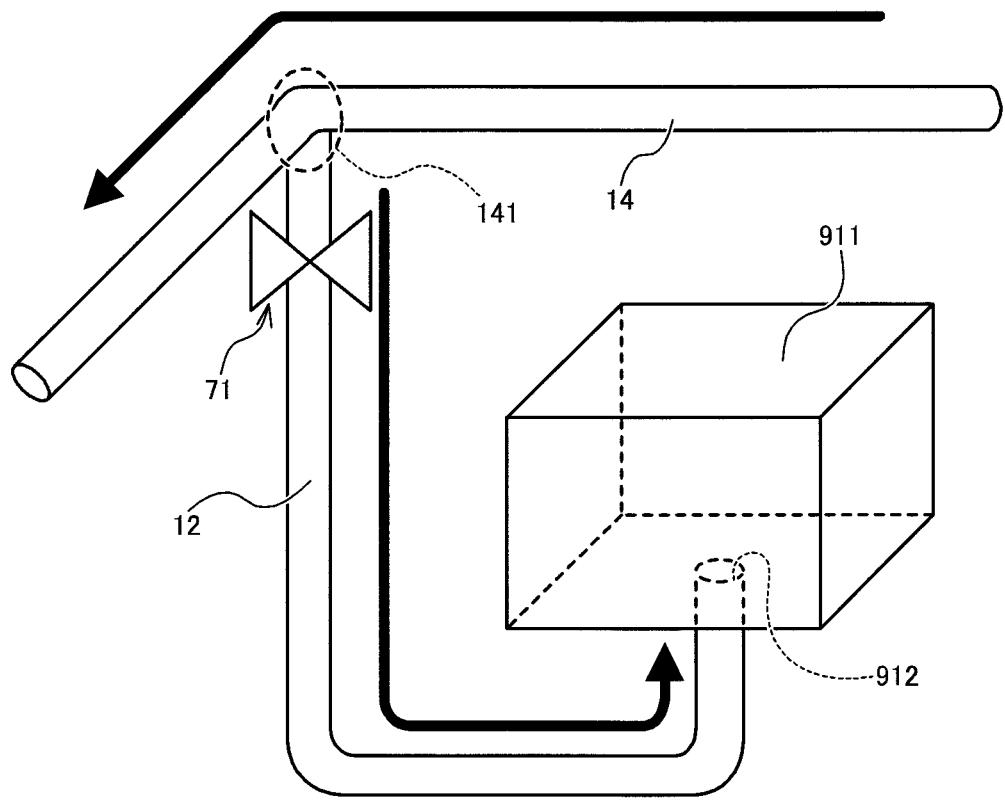
FIG. 5 is a diagram showing a connection relation between a circulation pipe, a pipe, and a coater included in the battery electrode slurry distributing apparatus according to the first embodiment of the present invention.

FIG. 5 is a perspective diagram showing a connection relation between the circulation pipe 14, the pipe 12, and the coater 91. In FIG. 5, the arrows each indicate the direction in which the positive electrode slurry flows.

The circulation pipe 14 is structured in the form of a polygonal loop (rectangular loop in the present embodiment). One end of the pipe 12 is connected to an elbow portion 141 of the circulation pipe 14 at which the circulation pipe 14 is bent. Accordingly, the positive electrode slurry that flows through the circulation pipe 14 collides with the inner wall of the elbow portion 141 of the circulation pipe 14. This weakens the flow of the positive electrode slurry at the elbow portion 141. This allows the positive electrode slurry to easily flow to the pipe 12 in a period in which the two-way valve 71 is opened. Accordingly, in the period in which the two-way valve 71 is opened, the positive electrode slurry is supplied from the circulation pipe 14 to the pipe 12 with high efficiency.

Specifically, the one end of the pipe 12 is connected to the lower portion of the elbow portion 141. Furthermore, the pipe 12 is arranged such that it extends downward in the vertical direction from the lower portion of the elbow portion 141. Accordingly, in the period in which the two-way valve 71 is opened, this allows the positive electrode slurry that flows through the circulation pipe 14 to flow into the pipe 12 with further improved efficiency due to gravity. Thus, in the period in which the two-way valve 71 is opened, the positive electrode slurry is supplied with further improved efficiency from the circulation pipe 14 to the pipe 12.

The other end of the pipe 12 is connected to a storage tank 911 provided to the coater 91. After the positive electrode slurry flows into the pipe 12, the positive electrode slurry is stored in the storage tank 911. The coater 91 coats a collector body with the positive electrode slurry thus stored in the storage tank 911 as described above. It should be noted that the internal space is preferably filled with an inert gas. The pressure of the internal space of the storage tank 911 is controlled as appropriate according to the amount of the positive electrode slurry thus stored.

In this arrangement, the other end of the pipe 12 is connected to the bottom face of the storage tank 911 via a through hole 912 formed in the bottom face of the storage tank 911. With this arrangement, the positive electrode slurry is supplied to the storage tank 911 from the pipe 12 such that it gushes up in the vertical direction. Accordingly, this arrangement is capable of preventing the positive electrode slurry from falling on the bottom face of the storage tank 911 and from falling on the positive electrode slurry that has already stored in the storage tank 911 as compared with an arrangement in which the positive electrode slurry is supplied from the upper side of the storage tank 911. Accordingly, this arrangement is capable of preventing the positive electrode slurry from containing bubbles due to high-speed collision of the positive electrode slurry supplied via the pipe 12 with the bottom face of the storage tank 911 or otherwise the stored positive electrode slurry.

The connection between the circulation pipe 14, the pipe 13, and the coater 92 is configured in the same manner as that between the circulation pipe 14, the pipe 121, and the coater 91 as described above. With this arrangement, in a period in which the two-way valve 72 is opened, the positive electrode slurry is supplied to the coater 92 from the circulation pipe 14 via the pipe 13, as with the positive electrode supply to the coater 91 from the circulation pipe 14 via the pipe 12 as described above.

The battery electrode slurry distributing apparatus 1 having the aforementioned configuration provides the following advantages.

With the battery electrode slurry distributing apparatus 1, the positive electrode slurry is circulated by the circulation pipe 14. Specifically, the positive electrode slurry circulates via the circulation pipe 14. Accordingly, this arrangement allows the time for which the positive electrode slurry remains stationary to be reduced. This is capable of suppressing the occurrence of separation or reaggregation in the positive electrode slurry.

Furthermore, the battery electrode slurry distributing apparatus 1 controls the two-way valves 71 and 72 such that the two valves are not opened at the same time. With this arrangement, in a period in which the supply of the positive electrode slurry is allowed for one selected from among the coaters 91 and 92, the supply of the positive electrode slurry is inhibited for the other coater that differs from the selected coater. Thus, only a single coater selected from among the coaters 91 and 92 receives the supply of the positive electrode slurry at the same time. Accordingly, the positive electrode slurry pressured by the battery electrode slurry forming apparatus 100 and the Mohno pumps 51 and 52 is not supplied to the coaters 91 and 92 in a distributed manner. Instead, the positive electrode slurry is supplied to a selected one from among the coaters 91 and 92 in a concentrated manner.

Description will be made below regarding investigation of an example in which ten coaters are connected to the circulation pipe 14, and the positive electrode slurry is supplied to the ten coaters at the same time. The positive electrode slurry is supplied via the circulation pipe 14 to the ten coaters in an order from an upstream stage to a downstream stage. Accordingly, the instantaneous flow rate of the positive electrode slurry that flows through the internal space of the pipe 14 becomes smaller closer to the last-stage coater. Accordingly, this leads to a reduction in the flow rate of the positive electrode slurry flowing through the internal space of the circulation pipe 14. In some cases, this leads to the potential for the positive electrode slurry to remain stationary. In order to prevent such a problem, there is a need to control the battery electrode slurry forming apparatus 100 and the Mohno pumps 51 and 52 so as to raise the pressure applied to the positive electrode slurry. In contrast, with the aforementioned arrangement in which the positive electrode slurry is supplied in a concentrated manner to one selected from among the coaters 91 and 92, this arrangement is capable of preventing the flow rate of the positive electrode slurry flowing through the internal space of the circulation pipe 14 from greatly falling. As a result, there is no need to control the battery electrode slurry forming apparatus 100 and the Mohno pumps 51 and 52 so as to raise the pressure applied to the positive electrode slurry. Because there is no need to apply a large pressure to the positive electrode slurry, this allows the battery electrode slurry distributing apparatus 1 to employ a simple configuration and a simple control operation as compared with an arrangement in which the positive electrode slurry is supplied to the coaters 91 and 92 at the same time. Furthermore, this arrangement is capable of supplying the positive electrode slurry to each of the coaters 91 and 92 in a short period of time.

It should be noted that, when the positive electrode slurry is supplied to the coater 91 or otherwise to the coater 92, the two-way valve 73 is closed. In this state, the positive electrode slurry is not circulated via the circulation pipe 14. However, as described above, this arrangement requires only a short period of time to supply the positive electrode slurry to each of the coaters 91 and 92. That is to say, this arrangement involves only a short period of time for which the circulation of the positive electrode slurry via the circulation pipe 14 is suspended. Accordingly, this arrangement is capable of preventing the occurrence of separation and reaggregation in the positive electrode slurry even if the positive electrode slurry remains stationary in the internal space of the pipe in a period in which the positive electrode slurry is supplied to the coater 91 or otherwise 92.

Furthermore, the battery electrode slurry distributing apparatus 1 circulates the positive electrode slurry supplied from the pipe 11 by the pressure applied to the positive electrode slurry from the battery electrode slurry forming apparatus 100 and the Mohno pumps 51 and 52. This allows the positive electrode slurry to be circulated in a sure manner using such a simple configuration.

Furthermore, in the battery electrode slurry distributing apparatus 1, the circulation pipe 14 is connected to the two coaters 91 and 92 via the pipes 12 and 13. This allows the multiple lines to perform the battery electrode manufacturing using the same positive electrode slurry formed by the battery electrode slurry forming apparatus 100. This provides improved uniformity of the battery electrodes. Furthermore, this arrangement allows the user to perform cleaning or maintenance for one from among the coaters 91 and 92 in a simple manner in a state in which the operation of the corresponding coater is suspended while operating the other coater so as to continue the battery electrode manufacturing.

Furthermore, in the battery electrode slurry distributing apparatus 1, the circulation pipe 14 is structured in the form of a rectangular loop. The coaters 91 and 92 are each connected to an elbow portion of the circulation pipe 14. This elbow portion weakens the flow of the positive electrode slurry. This allows the battery electrode slurry flowing through the circulation pipe 14 to easily flow into the pipes 12 and 13. Accordingly, this arrangement is capable of supplying the positive electrode slurry to the coaters 91 and 92 without involving a complicated control operation.

Furthermore, in the battery electrode slurry distributing apparatus 1, the circulation pipe 14 is connected to the coaters 91 and 92 via the pipes 12 and 13 each connected to the lower side of an elbow portion of the circulation pipe 14 and arranged such that they extend downward in the vertical direction. This allows the positive electrode slurry to be supplied to the coaters 91 and 92 from the circulation pipe 14 using gravity. Accordingly, this allows the positive electrode slurry to be more easily supplied to the coaters 91 and 92.

Furthermore, when the positive electrode slurry is to be supplied to any one from among the coaters 91 and 92, the battery electrode slurry distributing apparatus 1 closes the two-way valve 73. In this state, the positive electrode slurry does not flow into the tank 21 after passing through the filter 41. This allows the positive electrode slurry to be more easily supplied to the coaters 91 and 92.

Furthermore, in the battery electrode slurry distributing apparatus 1, the pipes 12 and 13 are provided with the two-way valves 71 and 72, respectively. This allows the battery electrode slurry distributing apparatus 1 to control the open/closed state for each of the two-way valves 71 and 72. This arrangement is capable of independently controlling the amounts of the positive electrode slurry to be supplied to the respective coaters 91 and 92.

Furthermore, with the battery electrode slurry distributing apparatus 1, the positive electrode slurry is supplied via the bottom face of the storage tank 911 included in the coater 91. With this arrangement, the positive electrode slurry is supplied to the storage tank 911 such that it gushes up in the vertical direction. Accordingly, this arrangement is capable of preventing the positive electrode slurry from falling on the bottom face of the storage tank 911 and from falling on the positive electrode slurry already stored in the storage tank 911 as compared with an arrangement in which the positive electrode slurry is supplied from the upper side of the storage tank 911. Accordingly, this arrangement is capable of preventing the positive electrode slurry from containing bubbles due to high-speed collision of the positive electrode slurry thus supplied with the bottom face of the storage tank 911 or otherwise the stored positive electrode slurry.

Furthermore, with the battery electrode slurry distributing apparatus 1, the defoaming unit 31 performs a defoaming operation for the positive electrode slurry circulated via the circulation pipe 14. Moreover, the filter 41 removes impurities contained in the positive electrode slurry circulated via the circulation pipe 14. This provides improved quality of the positive electrode slurry.

Furthermore, with the battery electrode slurry distributing apparatus 1, the tank 21 stores the positive electrode slurry supplied from the battery electrode slurry forming apparatus 100 via the pipe 11 and the positive electrode slurry circulated via the circulation pipe 14. At the same time, the positive electrode slurry thus stored is continuously supplied to the circulation pipe 14. With this arrangement, the positive electrode slurry thus supplied and the positive electrode slurry thus circulated are mixed, thereby allowing variation in the quality of the positive electrode slurry to be reduced. This provides high uniformity in the quality of the positive electrode slurry.

Furthermore, with the battery electrode slurry distributing apparatus 1, the tank 21 allows a sufficient amount of the positive electrode slurry to be supplied to the coaters 91 and 92 in a stable manner even if an increase or otherwise a reduction occurs in the flow of the positive electrode slurry supplied to the circulation pipe 14, i.e., the flow of the positive electrode slurry supplied from the battery electrode slurry forming apparatus 100 via the pipe 11. Specifically, when the amount of the positive electrode slurry that is being supplied to the circulation pipe 14 is smaller than the sum total of those required for the coaters 91 and 92, the battery electrode slurry distributing apparatus 1 compensates for the deficiency using the positive electrode slurry stored in the tank 21. Conversely, when the amount of the positive electrode slurry that is being supplied to the circulation pipe 14 is larger than the sum total of those required for the coaters 91 and 92, the excess amount can be stored in the tank 21.

Furthermore, in the battery electrode slurry processing apparatus AA including the aforementioned battery electrode slurry distributing apparatus 1, the battery electrode slurry forming apparatus 100 is installed at a position that is higher than that at which the battery electrode slurry distributing apparatus 1 is installed. For example, in a manufacturing factory, the battery electrode slurry forming apparatus 100 is installed on an upper floor, and the battery electrode slurry distributing apparatus 1 is installed on a floor that is lower than that on which the battery electrode slurry forming apparatus 100 is installed. With this arrangement, the positive electrode slurry is transferred downward in the vertical direction from the battery electrode slurry forming apparatus 100 to the battery electrode slurry distributing apparatus 1. That is to say, this arrangement can use gravity to transfer the positive electrode slurry. This allows the positive electrode slurry to be easily supplied from the battery electrode slurry forming apparatus 100 to the battery electrode slurry distributing apparatus 1 even if the positive electrode slurry has high viscosity.

Second Embodiment

Figure 6:
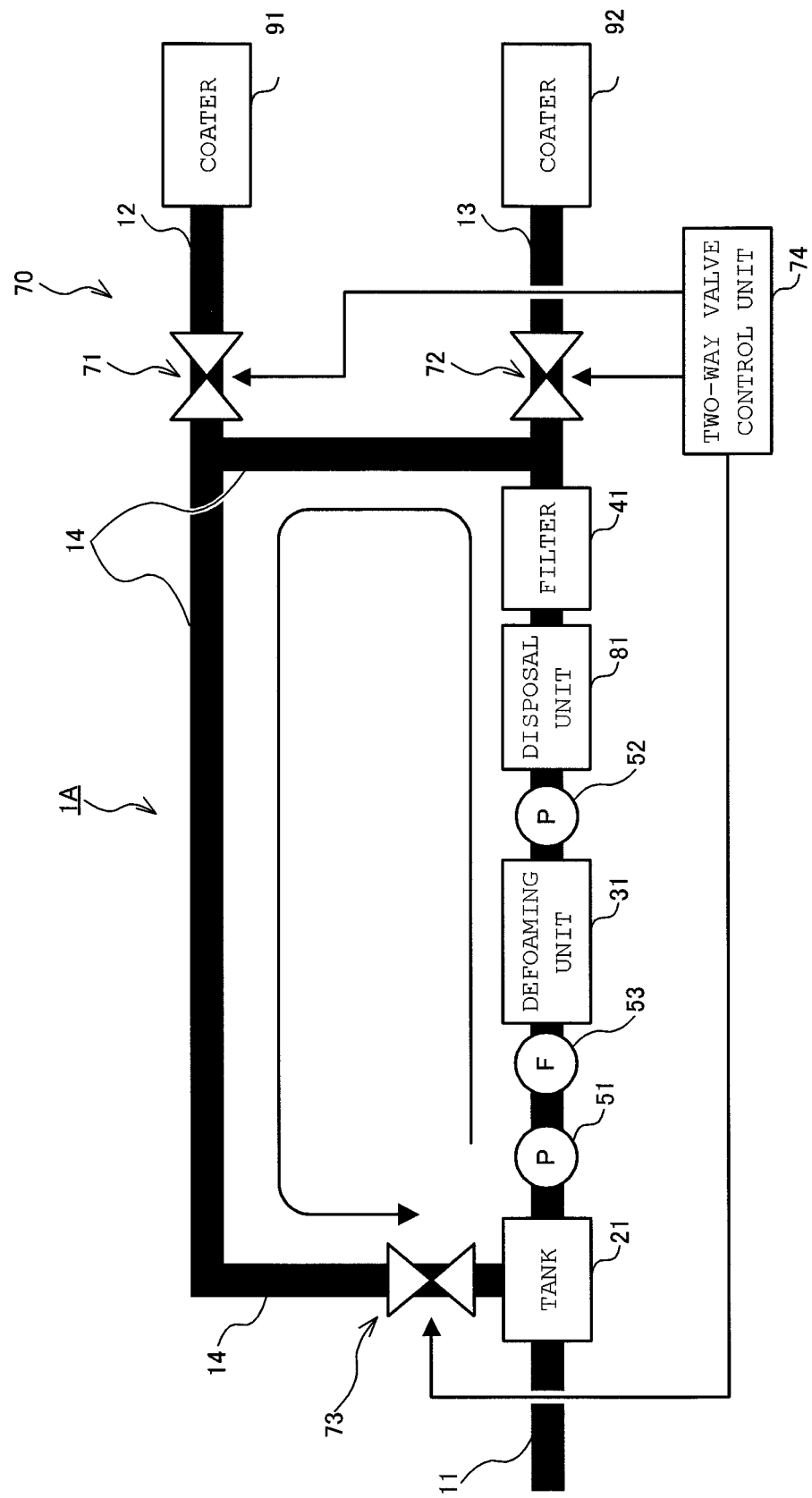
FIG. 6 is a configuration diagram showing a schematic configuration of a battery electrode slurry distributing apparatus according to a second embodiment of the present invention.

FIG. 6 is a configuration diagram showing a schematic configuration of a battery electrode slurry distributing apparatus 1A according to a second embodiment of the present invention. The battery electrode slurry processing apparatus AA can be provided with the battery electrode slurry distributing apparatus 1A instead of the battery electrode slurry distributing apparatus 1 according to the first embodiment of the present invention shown in FIG. 1. The point of difference between the battery electrode slurry distributing apparatuses 1A and 1 is that the battery electrode slurry distributing apparatus 1A includes a mass flowmeter 53 and a disposal unit 81. It should be noted that, in the battery electrode slurry distributing apparatus 1A, the same components as those of the battery electrode slurry distributing apparatus 1 are denoted by the same reference symbols, and description thereof will be omitted.

The mass flowmeter 53 and the disposal unit 81 are provided to the circulation pipe 14.

The mass flowmeter 53 measures the mass flow of the positive electrode slurry flowing through the internal space of the circulation pipe 14, and specifically, measures the instantaneous flow rate of the positive electrode slurry flowing through the internal space of the circulation pipe 14. The mass flowmeter 53 transmits the measurement result to the tank 21 and the Mohno pump 51. Furthermore, the mass flowmeter 53 checks whether or not a change in the instantaneous flow rate has occurred, and manages the information with respect to the integrated flow. The tank 21 determines the amount of the positive electrode slurry to be discharged, based on the measurement result transmitted from the mass flowmeter 53. That is to say, the tank 21 continuously supplies the positive electrode slurry thus stored to the circulation pipe 14 based on the amount to be discharged thus determined. The Mohno pump 51 determines the pressure to be applied, based on the measurement result transmitted from the mass flowmeter 53. That is to say, the Mohno pump 51 applies the pressure thus determined, in the direction indicated by the arrow shown in FIG. 6, to the positive electrode slurry flowing through the internal space of the circulation pipe 14.

The disposal unit 81 is configured to be capable of selectively performing disposal of at least a part of the positive electrode slurry flowing through the circulation pipe 14.

The battery electrode slurry distributing apparatus 1A having the aforementioned configuration provides the following advantages in addition to the aforementioned advantages that can be provided by the battery electrode slurry distributing apparatus 1.

With the battery electrode slurry distributing apparatus 1A, the disposal unit 81 allows selective disposal of at least a part of the positive electrode slurry circulated via the circulation pipe 14. This arrangement is capable of performing a disposal operation in a simple manner for the positive electrode slurry that could have degraded due to long-time circulation via the circulation pipe 14, for example.

It should be noted that although detailed description has been made regarding the embodiment of the present invention with reference to the drawings, specific configurations thereof are not restricted to this embodiment. Rather, various changes of design may be made, which are encompassed by the present invention without departing from the spirit or scope of the appended claims.

Description has been made in the first embodiment with reference to FIG. 3 regarding an example in which the circulation pipe 14 is structured in the form of a rectangular loop. However, the present invention is not restricted to this example. Rather, the circulation pipe 14 may be structured in the form of a loop having multiple elbow portions. It should be noted that the circulation pipe 14 is preferably structured to have the elbow portions each having a bending angle on the order of 90 degrees.

Description has been made in the first embodiment with reference to FIG. 3 regarding an arrangement in which the circulation pipe 14 is structured in a rectangular loop and the coaters 91 and 92 are respectively connected to two from among the four elbow portions. However, the present invention is not restricted to such an arrangement. Also, all the elbow portions may each be connected to such a coater. Also, a part of the elbow portions may each be connected to such a coater.

Description has been made in the second embodiment regarding an arrangement in which a mass flowmeter, i.e., the mass flowmeter 53, is employed as a flowmeter. However, the present invention is not restricted to such an arrangement. For example, a volume flowmeter may be employed. Examples of such a volume flowmeter that can be employed include vortex flowmeters, turbine flowmeters, electromagnetic flowmeters, variable area flowmeters, ultrasonic flowmeters, differential pressure flowmeters, etc.

Description has been made in the aforementioned embodiments regarding an arrangement in which two coaters, i.e., the coaters 91 and 92, are connected to the circulation pipe 14. However, the present invention is not restricted to such an arrangement. For example, three or four coaters may be connected to the circulation pipe 14. It should be noted that, in a case in which three coaters are connected to the circulation pipe 14, for example, three two-way valves are provided in addition to the two-way valve 73. With this arrangement, in a period in which any one of the three two-way valves that differ from the two-way valve 73 is opened, the other two-way valves from among the three two-way valves are closed.

Description has been made in the aforementioned embodiments regarding an arrangement in which the Mohno pumps 51 and 52 are employed in order to circulate the positive electrode slurry via the circulation pipe 14. However, the present invention is not restricted to such an arrangement. Examples of the pumps that can be employed include diaphragm pumps, piston pumps, plunger pumps, Delasco pumps, gear pumps, vane pumps, etc.

Description has been made in the aforementioned embodiments regarding an arrangement in which the positive electrode slurry is supplied to the pipe 11. However, the present invention is not restricted to such an arrangement. Also, a negative electrode slurry or other kinds of suspensions that differ from the battery electrode slurry may be supplied. It should be noted that, in a case in which a suspension that differs from the battery electrode slurry is to be supplied, the devices connected to the circulation pipe 14 are not necessary coaters. Rather, other devices or the like that correspond to the usage may be connected to the circulation pipe 14 as appropriate. Also, such an arrangement does not necessary require the filter 41. Rather, whether or not the filter 41 is to be provided may preferably be determined according to the usage.

Description has been made in the aforementioned embodiments regarding an arrangement in which the two-way valve 73 is provided to the circulation pipe 14 such that it is in the vicinity of the inlet of the tank 21 to which the positive electrode slurry circulated via the circulation pipe 14 is supplied. However, the present invention is not restricted to such an arrangement. In a case in which the circulation pipe 14 is installed at a position that is higher than the positions at which the pipes 12 and 13 and the two-way valves 71 and 72 are installed, this arrangement is also able to use gravity to supply the positive electrode slurry from the circulation pipe 14 to the coaters 91 and 92. In this case, an arrangement may be made including no two-way valve 73.

Description has been made in the aforementioned embodiments regarding an arrangement in which the two-way valves 71 through 73 are provided. However, the present invention is not restricted to such an arrangement. Also, two three-way valves may be provided instead of the two-way valves 71 through 73. In this case, an arrangement may be made in which one of the two three-way valves is provided to a connection that connects the circulation pipe 14 and the pipe 12, and the other one of the two three-way valves is provided to a connection that connects the circulation pipe and the pipe 13. With this arrangement, when the positive electrode slurry is to be supplied to the coater 91, the one three-way valve having three ports is controlled such that the port on the filter 41 side connected to the circulation pipe 14 communicates with the port connected to the pipe 12. At the same time, the other three-way valve having three ports is controlled such that the port on the filter 41 side connected to the circulation pipe 14 communicates with the port on the tank 21 side connected to the circulation pipe 14. When the positive electrode slurry is to be supplied to the coater 92, the other three-way valve having such three ports is controlled such that the port on the filter 41 side connected to the circulation pipe 14 communicates with the port connected to the pipe 13.

Description has been made in the first embodiment with reference to FIG. 3 regarding an arrangement in which the tank 21, the defoaming unit 31, the filter 41, and the Mohno pumps 51 and 52 are provided to the battery electrode slurry distributing apparatus 1. However, the present invention is not restricted to this arrangement. Also, such components may be provided to the battery electrode slurry forming apparatus 100 or otherwise between the battery electrode slurry forming apparatus 100 and the battery electrode slurry distributing apparatus 1.

Description has been made in the second embodiment with reference to FIG. 6 regarding an arrangement in which the tank 21, the defoaming unit 31, the filter 41, the Mohno pumps 51 and 52, and the mass flowmeter 53 are provided to the battery electrode slurry distributing apparatus 1A. However, the present invention is not restricted to this arrangement. Also, such components may be provided to the battery electrode slurry forming apparatus 100 or otherwise between the battery electrode slurry forming apparatus 100 and the battery electrode slurry distributing apparatus 1A.

Third Embodiment

Figure 7:
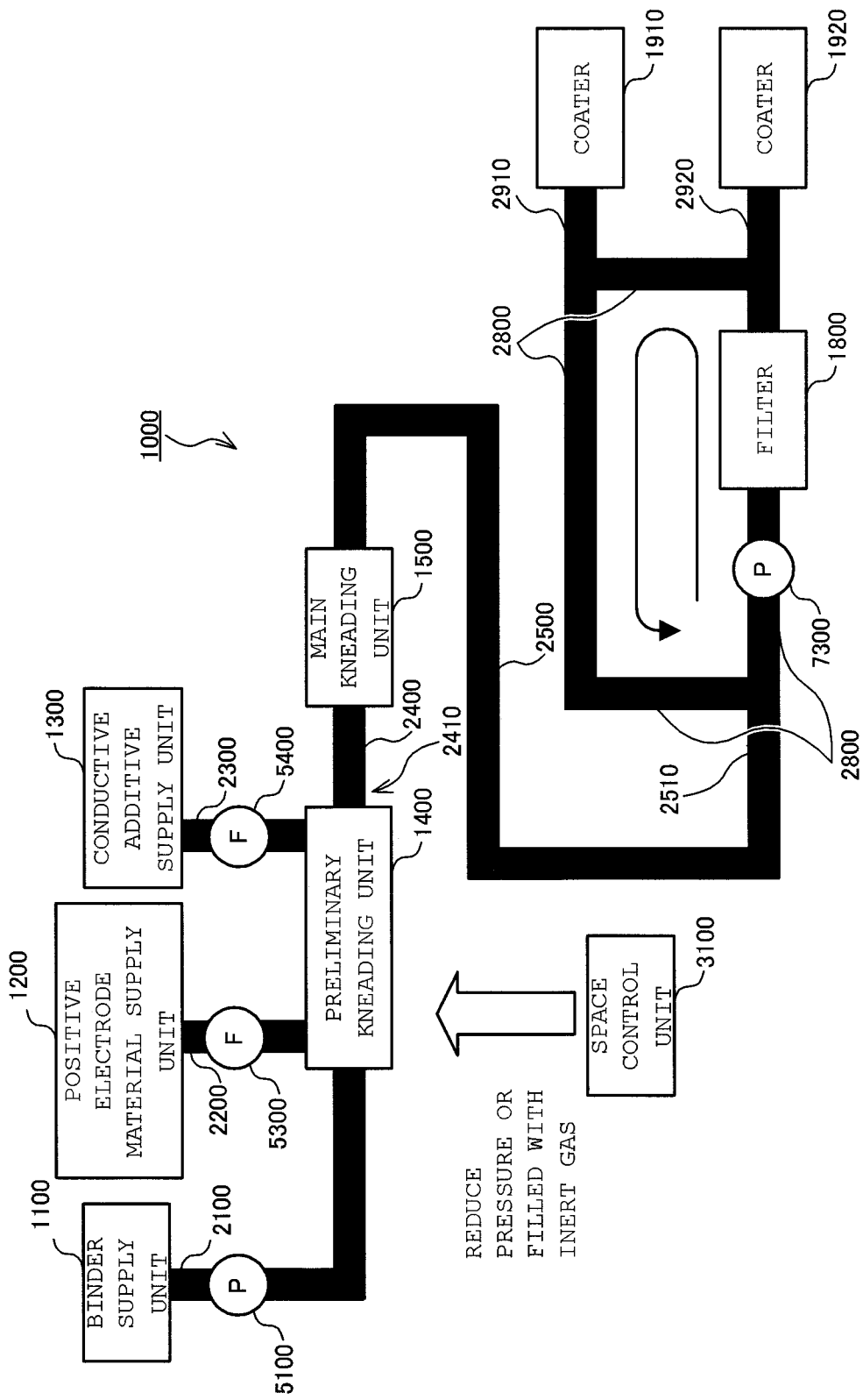
FIG. 7 is a configuration diagram showing a schematic configuration of a battery electrode slurry processing apparatus according to a third embodiment of the present invention.

FIG. 7 is a configuration diagram showing a schematic configuration of a battery electrode slurry processing apparatus 1000 according to a third embodiment of the present invention. The battery electrode slurry processing apparatus 100 is an apparatus configured to form a positive electrode slurry to be used to manufacture a positive electrode of a lithium-ion secondary battery by kneading multiple materials such as a binder, a positive-electrode active material, and a conductive additive (conductive auxiliary material), and to coat a collector body with the positive electrode slurry thus formed.

The binder is stored in a binder supply unit 1100. The binder supply unit 1100 is arranged such that it communicates with a pipe 2100. The binder supply unit 1100 continuously supplies a binder to the pipe 2100. The pipe 2100 is arranged such that it communicates with a preliminary kneading unit 1400. Furthermore, the pipe 2100 is provided with a Mohno pump 5100. The Mohno pump 5100 applies pressure to the binder supplied to the pipe 2100 such that it flows toward the preliminary kneading unit 1400.

It should be noted that the aforementioned continuous supply means that the supply is continuously performed without interruption (unceasingly) in terms of time. Thus, the continuous supply of the binder to the pipe 2100 means that the binder is continuously supplied to the pipe 2100 without interruption (unceasingly) in terms of time.

Examples of such a binder that can be employed include organic solvent (non-aqueous) binders such as polyvinylidene fluoride (PVDF), polytetrafluoroethylene (PTFE), etc., each of which can be used after it is dissolved in an organic solvent. Also, aqueous binders may be employed. Examples of such aqueous binders that can be dispersed in water include: styrene-butadiene rubber (SBR); ethylene unsaturated carboxylic esters such as methyl acrylate (methyl methacrylate), ethyl acrylate (ethyl methacrylate), butyl acrylate (butyl methacrylate), acrylonitrile (methacrylonitrile), hydroxyl acrylate (hydroxyl methacrylate), etc.; and ethylene unsaturated carboxylic acids such as acrylic acid, methacrylic acid, itaconic acid, fumaric acid, and maleic acid. Also, examples of such binders that can be employed include: aqueous polymers such as carboxymethyl cellulose (CMC) or the like, which has also attracted attention in recent years as a binder in addition to its use together with SBR; alginate compounds; etc. Also, a mixture of the aforementioned multiple kinds of materials can be employed.

Also, such a binder may be used in a state in which it is dissolved or otherwise dispersed in a solvent. Examples of such a solvent include N-Methylpyrrolidone, dimethylformamide, isopropanol, toluene, water, etc. Also, a mixture of the aforementioned multiple kinds of materials can be employed. Such a solvent may be selectively employed according to the kinds and the characteristics of the conductive additive and the active material to be employed.

The positive-electrode active material is stored in a positive electrode material supply unit 1200. The positive electrode material supply unit 1200 is installed such that it communicates with a pipe 2200. The positive electrode material supply unit 1200 continuously supplies the positive-electrode active material to the pipe 2200. The pipe 2200 is arranged such that it communicates with the preliminary kneading unit 1400. Furthermore, the pipe 2200 is provided with a weight scale 5300. The weight scale 5300 measures the weight of the positive-electrode active material that flows through the internal space of the pipe 2200 from the positive electrode material supply unit 1200 toward the preliminary kneading unit 1400, and acquires the instantaneous flow rate of the positive-electrode active material flowing through the internal space of the pipe 2200. Furthermore, the weight scale 5300 transmits the measurement results to the positive electrode material supply unit 1200. Furthermore, the weight scale 5300 checks whether or not a change has occurred in the instantaneous flow rate, and manages the information with respect to the integrated flow. The positive electrode material supply unit 1200 is provided with a feeder (not shown) configured to supply a positive-electrode active material to the pipe 2200 when it is fed. The positive electrode material supply unit 1200 determines the amount of the positive-electrode active material to be supplied, based on the measurement results transmitted from the weight scale 5300. The positive electrode material supply unit 1200 continuously supplies the positive-electrode active material to the pipe 2200 via the feeder based on the amount to be supplied thus determined. The pipe 2200 is arranged such that it extends in the vertical direction such that the preliminary kneading unit 1400 communicates with the lower end of the pipe 2200. Accordingly, the positive-electrode active material thus supplied to the pipe 2200 freely falls due to gravity, thereby continuously supplying the positive-electrode active material to the preliminary kneading unit 1400.

It should be noted that examples of the positive-electrode active material include: materials having a layer structure or a spinel structure represented by the general chemical formula $Li_xMo_2$ ("M" represents at least one element selected from among Ni, Co, Fe, Mn, Si, and Al, and "x" represents a constant designed to satisfy the relation represented by $0<x<1.5$); materials having an olivine structure represented by the general chemical formula $Li_xAPO_4$ ("A" represents at least one metal element selected from among Ti, Zn, Mg, Co, and Mn, and "x" represents a constant designed to satisfy the relation represented by $0<x\leq1.2$); etc. In particular, a lithium metal phosphate compound containing an olivine lithium iron phosphate represented by the general chemical formula $Li_xFe_yA_{(1-y)}PO_4$ (note that "x" represents a constant designed to satisfy the relation represented by $0<x\leq1$, "y" represents a constant designed to satisfy the relation represented by $0<y\leq1$, and "A" represents at least one metal element selected from among Ti, Zn, Mg, Co, and Mn) is preferably employed. Also, particles each having a structure in which the surface of a lithium metal phosphate compound is coated with carbon may be employed. Also, an aggregate of such particles may be employed.

The conductive additive is stored in a conductive additive supply unit 1300. The conductive additive supply unit 1300 is arranged such that it communicates with a pipe 2300. The conductive additive supply unit 1300 continuously supplies the conductive additive to the pipe 2300. The pipe 2300 is arranged such that it communicates with the preliminary kneading unit 1400. Furthermore, the pipe 2300 is provided with a weight scale 5400. The weight scale 5400 measures the weight of the conductive additive that flows through the internal space of the pipe 2300 from the conductive additive supply unit 1300 toward the preliminary kneading unit 1400, and acquires the instantaneous flow rate of the conductive additive flowing through the internal space of the pipe 2300. Furthermore, the weight scale 5400 transmits the measurement results to the conductive additive supply unit 1300. Furthermore, the weight scale 5400 checks whether or not a change has occurred in the instantaneous flow rate, and manages the information with respect to the integrated flow. The conductive additive supply unit 1300 is provided with a feeder (not shown) configured to supply the conductive additive to the pipe 2300 when it is fed. The conductive additive supply unit 1300 determines the amount of the conductive additive to be supplied, based on the measurement results transmitted from the weight scale 5400. The conductive additive supply unit 1300 continuously supplies the conductive additive via the feeder based on the amount to be supplied thus determined. The pipe 2300 is arranged such that it extends in the vertical direction such that the preliminary kneading unit 1400 communicates with the lower end of the pipe 2300. Accordingly, the conductive additive thus supplied to the pipe 2300 freely falls due to gravity, thereby supplying the conductive additive to the preliminary kneading unit 1400.

It should be noted that examples of such a conductive additive that can be employed include carbon powder such as acetylene black, furnace black, carbon black, etc. Also, a mixture of multiple kinds of such carbon black may be employed.

With this arrangement, a suitable amount of binder pressured by the Mohno pump 5100 is supplied to the preliminary kneading unit 1400. At the same time, the positive-electrode active material and the conductive additive freely fall due to gravity, which allows a continuous supply to the preliminary kneading unit 1400 with a suitable amount for each of the positive-electrode active material and the conductive additive.

The preliminary kneading unit 1400 sequentially coarsely kneads the binder, the positive-electrode active material, and the conductive additive thus continuously supplied, and continuously discharges the mixture thus kneaded as a preliminary kneaded slurry. The preliminary kneading unit 1400 is installed such that it communicates with a main kneading unit 1500 via a pipe 2400. The preliminary kneaded slurry thus continuously discharged from the preliminary kneading unit 1400 is continuously supplied to the main kneading unit 1500 via the pipe 2400 by the pressure applied from the Mohno pump 5100 to the binder and the discharge pressure provided by the preliminary kneading unit 1400.

With this arrangement, the preliminary kneading unit 1400 continuously receives the supply of the binder, the positive-electrode active material, and the conductive additive, and continuously supplies the preliminary kneaded slurry while coarsely kneading these materials thus received. That is to say, the preliminary kneading unit 1400 continuously supplies the preliminary kneaded slurry to the main kneading unit 1500 and concurrently continuously coarsely kneads the newly supplied materials.

Examples of the kneading apparatus that can be employed as the preliminary kneading unit 1400 include the MIRACLE KCK manufactured by Asada Iron Works Co., Ltd, inline mixers manufactured by Silverson Corporation such as the Flashblend and Flashmix, powder dissolving systems manufactured by T-MEX CORPORATION, the MHD manufactured by IKA Corporation, etc. Description will be made regarding an example of the configuration of the preliminary kneading unit 1400 with reference to FIGS. 8 through 10.

Figure 8:
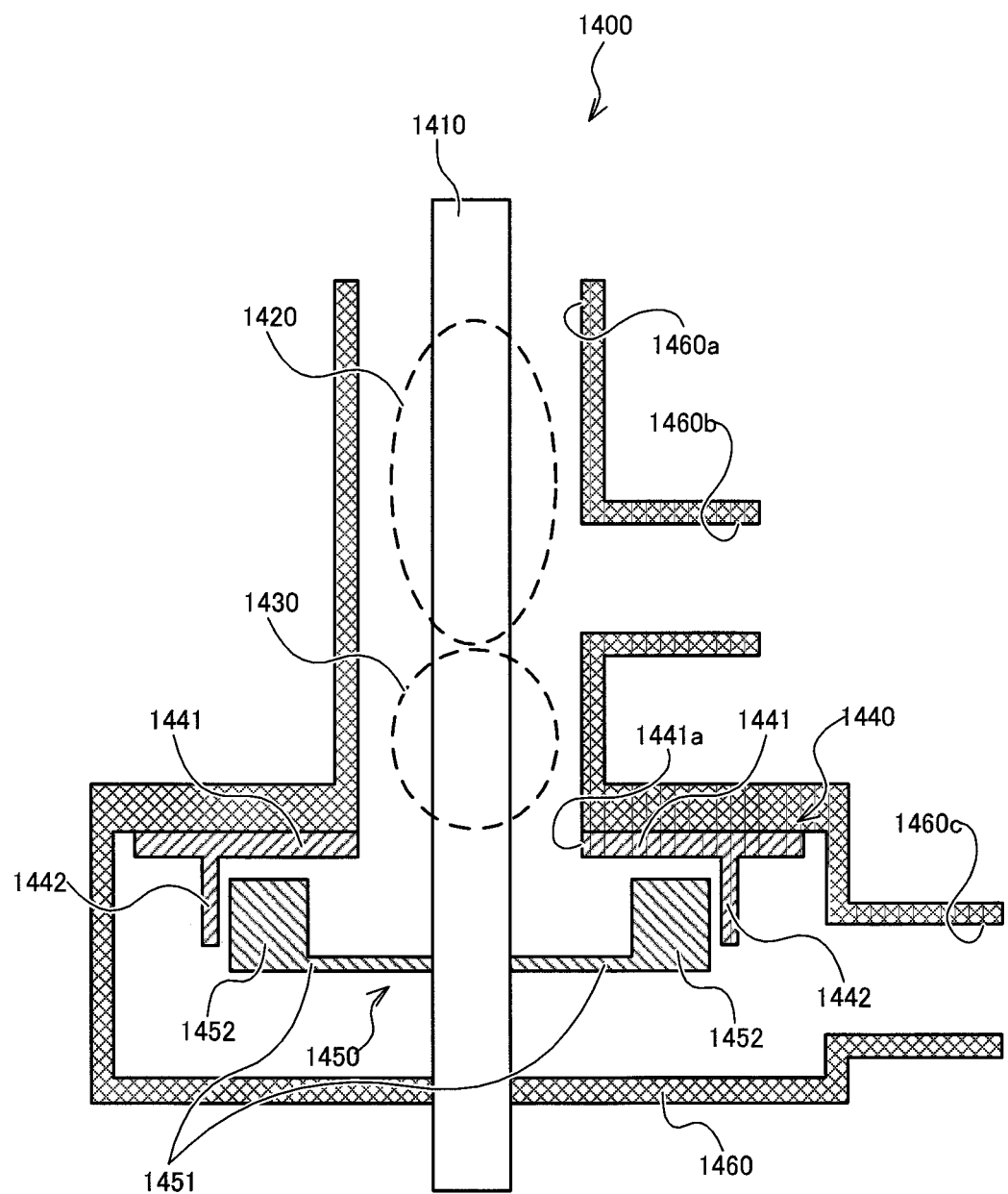
FIG. 8 is a cross-sectional diagram showing a schematic configuration of a preliminary kneading unit included in the battery electrode slurry processing apparatus according to the third embodiment of the present invention.

FIG. 8 is a cross-sectional diagram showing a schematic configuration of the preliminary kneading unit 1400. The preliminary kneading unit 1400 includes a rotor shaft 1410, a screw 1420, a propeller 1430, a stator 1440, a rotor 1450, and a casing 1460. The casing 1460 houses the screw 1420, the propeller 1430, the stator 1440, and the rotor 1450. Furthermore, a first opening 1460a, a second opening 1460b, and a third opening 1460c are formed in the casing 1460.

Figure 9:
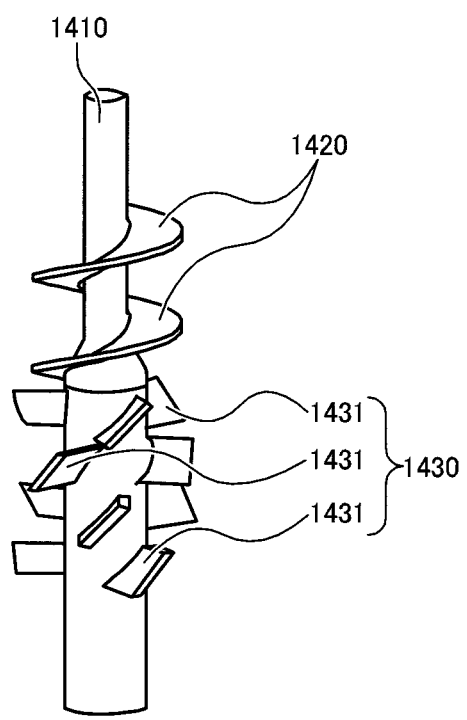
FIG. 9 is a perspective view showing a screw and a propeller included in the preliminary kneading unit according to the third embodiment of the present invention.

FIG. 9 is a perspective view of the screw 1420 and the propeller 1430. The screw 1420 is arranged so as to form a spiral shape with the rotor shaft 1410 as a center axis. The propeller 1430 includes multiple vanes 1431 arranged so as to form a spiral shape with respect to the rotor shaft 1410. The rotor shaft 1410 is rotationally driven by a motor (not shown) with the longitudinal center axis of the rotor shaft 1410 as its rotational axis. By rotating the rotor shaft 1410, this arrangement rotates the screw 1420 and the propeller 1430.

Returning to FIG. 8, the pipes 2200 and 2300 are arranged such that they communicate with the first opening 1460a. The positive-electrode active material and the conductive additive are supplied to the internal space of the casing 1460 via the first opening 1460a. The positive electrode material and the conductive additive thus supplied to the internal space of the casing 1460 are transferred downward in the vertical direction by the screw 1420 thus rotationally driven.

The pipe 2100 is arranged such that it communicates with the second opening 1460b. The binder is supplied to the internal space of the casing 1460 via the second opening 1460b. The binder thus supplied to the internal space of the casing 1460 is mixed as an initial mixing step by the propeller 1430 with the positive-electrode active material and the conductive additive transferred by the screw 1420. Subsequently, the mixture is transferred as an initial mixture to a position at which the stator 1440 and the rotor 1450 are installed.

Figure 10:
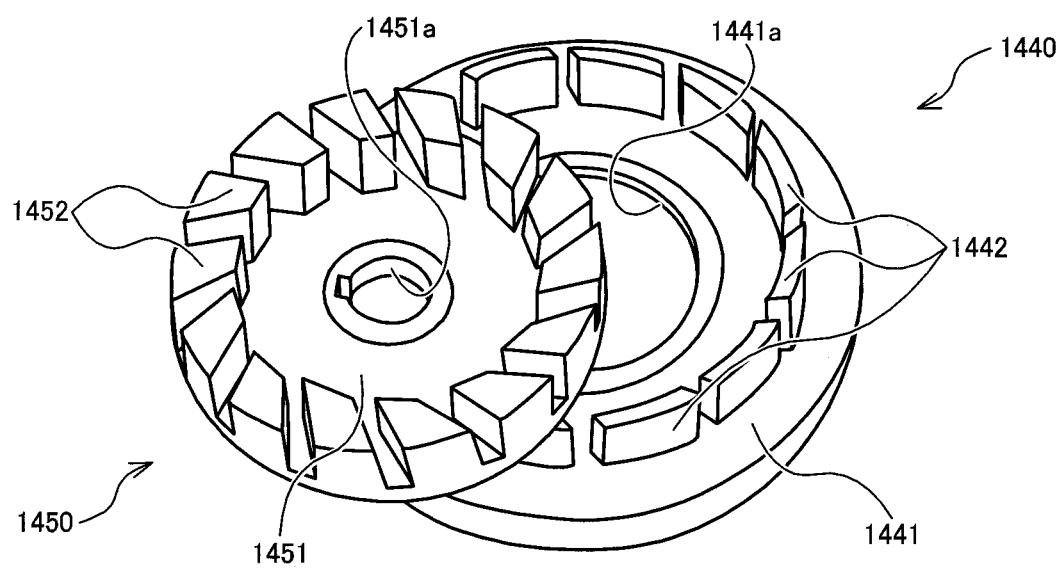
FIG. 10 is a perspective view showing a stator and a rotor included in the preliminary kneading unit according to the third embodiment of the present invention.

FIG. 10 is a perspective view of the stator 1440 and the rotor 1450. The stator 1440 includes a base 1441 and multiple upper comb-toothed blades 1442. The base 1441 is structured in a disk shape. Furthermore, a through hole 1441a is formed in a central portion of the base 1441. Moreover, the multiple upper comb-toothed blades 1442 are arranged on one face of the base 1441 with predetermined intervals such that they stand erect so as to surround the through hole 1441a. The other face of the base 1441 is fixedly mounted on the casing 1460. Accordingly, the upper comb-toothed blades 1442 are arranged such that they protrude downward in the vertical direction from the base 1441.

The rotor 1450 includes a base 1451 and multiple lower comb-toothed blades 1452. The base 1451 is structured in a disk shape. Furthermore, a through hole 1451a is formed in a central portion of the base 1451. Moreover, the multiple lower comb-toothed blades 1452 are arranged on one face of the base 1451 at predetermined intervals such that they stand erect along the outer edge of the base 1451. The rotor shaft 1410 is arranged such that it passes through the through hole 1451a of the base 1451. Furthermore, the base 1451 is fixedly mounted on the rotor shaft 1410 such that one face thereof faces the stator 1440. Accordingly, the lower comb-toothed blades 1452 are arranged such that they protrude upward in the vertical direction from the base 1451. When the rotor shaft 1410 is rotationally driven, this rotates the rotor 1450.

With this arrangement, the rotor 1450 is arranged such that it is housed in a space surrounded by the multiple upper comb-toothed blades 1442 provided to the stator 1440. Accordingly, this arrangement defines a space surrounded by the base 1441 of the stator 1440, the base 1451 of the rotor 1450, and the lower comb-toothed blades 1452. The initial mixture thus mixed by the propeller 1430 in the initial mixing stage is transferred via the through hole 1441a to this space thus defined.

In the rotating operation of the rotor 1450, the initial mixture transferred to the aforementioned space passes through the gaps between the multiple lower comb-toothed blades 1452 due to centrifugal force. Subsequently, the initial mixture passes through the gaps between the multiple upper comb-toothed blades 1442. As a result, the initial mixture is discharged as the preliminary kneaded slurry via the third opening 1460c formed such that it communicates with the pipe 2400. It should be noted that the initial mixture is pressed by the multiple upper comb-toothed blades 1442 in a stationary state and the multiple lower comb-toothed blades 1452 thus rotated in a stage in which it passes through the gaps between the multiple lower comb-toothed blades 1452. This applies strong shear stress to the initial mixture. This accelerates the mixing of the binder, the positive-electrode active material, and the conductive additive contained in the initial mixture, thereby obtaining the preliminary kneaded slurry.

It should be noted that, in a case in which a main kneading operation is performed as such an initial kneading step for a liquid material such as the binder and powder materials such as the positive-electrode active material and the conductive additive, this method has the potential to involve a problem of the mixture having liquid-rich regions and powder-rich regions. Moreover, in a stage immediately after the coarse kneading has been completed by the preliminary kneading unit 1400, the powder materials have not been dispersed in the liquid with sufficient uniformity. Accordingly, in this stage, the positive electrode slurry thus obtained does not exhibit a desired quality. In order to solve this problem, after the coarse kneading is performed by the preliminary kneading unit 1400, the main kneading is performed by the main kneading unit 1500.

Returning to FIG. 7, the main kneading unit 1500 sequentially performs the main kneading of the continuously supplied preliminary kneaded slurry, and discharges the mixture as the positive electrode slurry. The main kneading is performed by the main kneading unit 1500 in order to knead the preliminary kneaded slurry subjected to the coarse kneading by the preliminary kneading unit 1400 until the positive electrode slurry having a desired quality is obtained. A circulation pipe 2800 is arranged such that it communicates with the main kneading unit 1500 via a pipe 2500. The positive electrode slurry continuously discharged from the main kneading unit 1500 is continuously supplied to the circulation pipe 2800 via the pipe 2500 by the discharge pressure applied by the main kneading unit 1500.

With this arrangement, the main kneading unit 1500 continuously receives the supply of the preliminary kneaded slurry and continuously supplies the positive electrode slurry to the circulation pipe 2800 while performing the main kneading of the preliminary kneaded slurry. That is to say, the main kneading unit 1500 continuously supplies the positive electrode slurry to the circulation pipe 2800 and concurrently continuously kneads the newly supplied preliminary kneaded slurry.

It should be noted that a portion of the pipe 2400 coupled to the preliminary kneading unit 1400, i.e., one end of the pipe 2400 on the side of the preliminary kneading unit 1400, will be referred to as an "inlet portion 2410". A portion of the pipe 2500 coupled to the circulation pipe 2800, i.e., one end of the pipe 2500 on the side of the circulation pipe 2800, will be referred to as an "outlet portion 2510". With this arrangement, the main kneading unit 1500 is arranged between the inlet portion 2410 and the outlet portion 2510.

Examples of the kneading apparatus that can be employed as the main kneading unit 1500 include: stirrer apparatuses such as DR/DRO, UTL, and MKO manufactured by IKA Corporation; thin-film spin system high-speed mixers such as FILMIX (trademark) manufactured by PRIMIX Corporation, mixers such as ZERO MILL (trademark) manufactured by Asada Iron Works Co., Ltd., and the like. Description will be made below with reference to FIGS. 11 and 12 regarding an example of the configuration of the main kneading unit 1500.

Figure 11:
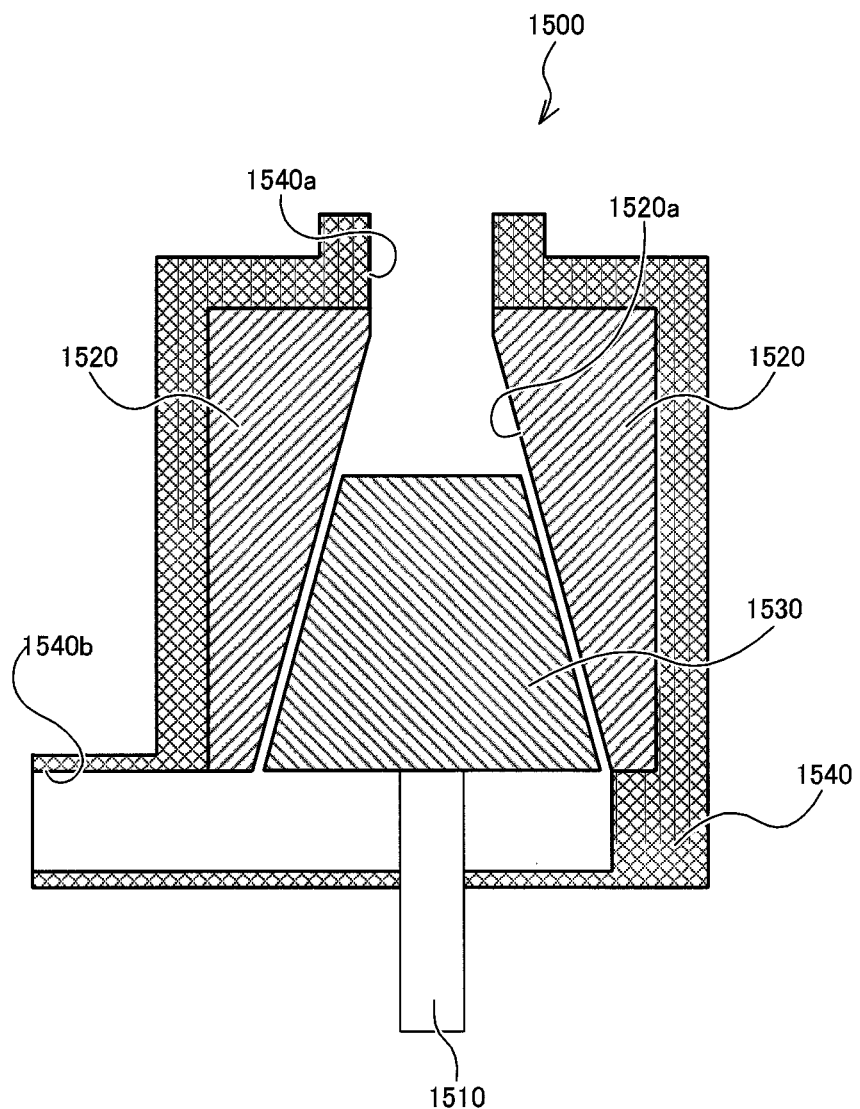
FIG. 11 is a cross-sectional diagram showing a schematic configuration of a main kneading unit included in the battery electrode slurry processing apparatus according to the third embodiment of the present invention.

FIG. 11 is a cross-sectional diagram showing a schematic configuration of the main kneading unit 1500. The main kneading unit 1500 includes a rotor shaft 1510, a stator 1520, a rotor 1530, and a casing 1540. The casing 1540 houses the stator 1520 and the rotor 1530 in its internal space. Furthermore, a first opening 1540a and a second opening 1540b are formed in the casing 1540.

Figure 12:
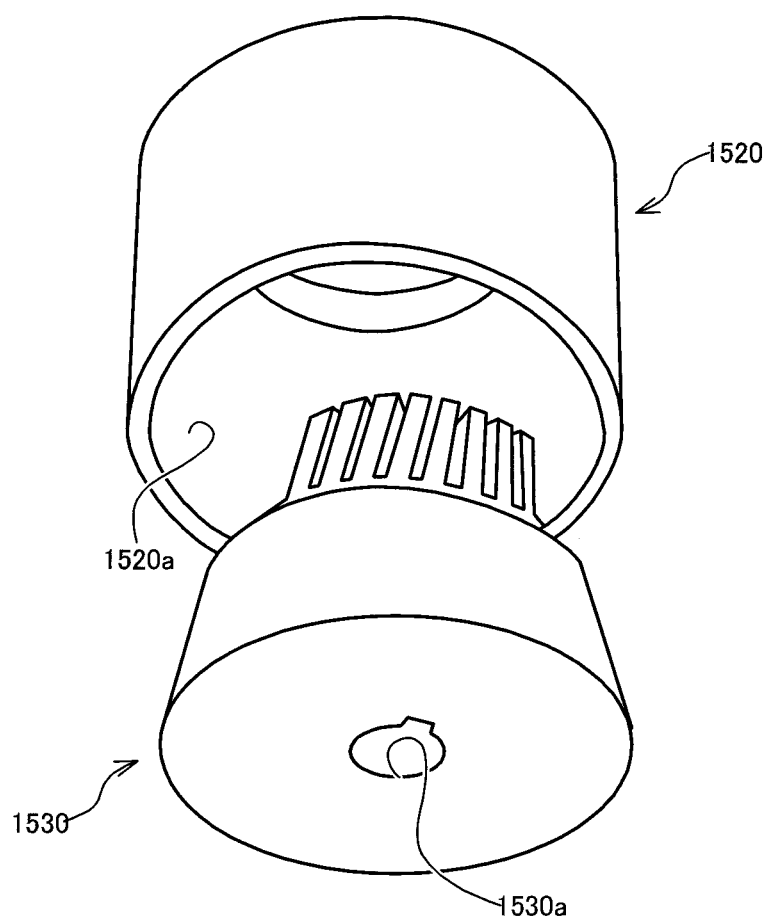
FIG. 12 is a perspective view showing a stator and a rotor included in a main kneading unit according to the third embodiment of the present invention.

FIG. 12 is a perspective view of the stator 1520 and the rotor 1530. The stator 1520 is structured in a cylindrical shape. A through hole 1520a is formed in the stator 1520 so as to form an internal space in the stator 1520 such that it passes from the upper face to the bottom face of the stator 1520. As shown in FIG. 11, the through hole 1520a is structured to have a tapered slope having a circular cross-sectional shape along a plane that is parallel to the upper face and the bottom face of the stator 1520 such that the diameter thereof becomes larger closer to the bottom face from the top face. The stator 1520 is fixedly mounted on the casing 1540. The stator 1520 is arranged such that its upper face faces the first opening 1540a side.

The rotor 1530 is structured in a circular truncated cone shape. Specifically, the rotor 1530 is structured to have a tapered slope with an angle that is approximately equal to that of the through hole 1520a formed in the stator 1520, such that the diameter thereof becomes larger closer to the bottom face from the upper face of the rotor 1530. The rotor 1530 is arranged such that it is inserted from its upper face into the through hole 1520a of the stator 1520. The rotor 1530 is fixedly mounted on the rotor shaft 1510 in a state in which the rotor shaft 1510 is inserted into a rotor shaft receiving hole 1530a formed in the bottom face of the rotor 1530. The rotor shaft 1510 is rotationally driven by a motor (not shown) with the longitudinal center axis of the rotor shaft 1510 as its rotational axis. When the rotor shaft 1510 is rotationally driven, this rotates the rotor 1530.

With this arrangement, the pipe 2400 is arranged such that it communicates with the first opening 1540a. The preliminary kneaded slurry is supplied to the internal space of the through hole 1520a via the first opening 1540a. The preliminary kneaded slurry thus supplied to the internal space of the through hole 1520a passes through the gaps between the stator 1520 in a stationary state and the rotated rotor 1530, and is discharged as the positive electrode slurry from the second opening 1540b that communicates with the pipe 2500. It should be noted that, in a stage in which the preliminary kneaded slurry passes through the gaps between the stator 1520 and the rotor 1530, the preliminary kneaded slurry is ground and milled at a contact interface between the stator 1520 in a stationary state and the rotor 1530 thus rotated by friction that occurs between them. This accelerates the mixing of the binder, the positive-electrode active material, and the conductive additive contained in the preliminary kneaded slurry, thereby obtaining the positive electrode slurry.

Returning to FIG. 7, the circulation pipe 2800 is structured in the form of a loop using the same kind of pipe as that of the pipes 2100 through 2500. Furthermore, a Mohno pump 7300 and a filter 1800 are provided to the circulation pipe 2800. The Mohno pump 7300 applies pressure to the positive electrode slurry supplied to the circulation pipe 2800 toward the filter 1800. The filter 1800 removes impurities contained in the positive electrode slurry circulated through the internal space of the circulation pipe 2800. Examples of such impurities to be removed by the filter 1800 include bubbles, aggregated clusters that have not been dispersed, etc.

The circulation pipe 2800 is arranged such that it communicates with the coater 1910 via a pipe 2910, and such that it communicates with the coater 1920 via a pipe 2920. At least a part of the positive electrode slurry circulated through the internal space of the circulation pipe 2800 is continuously supplied to the coaters 1910 and 1920 by pressure applied by the Mohno pump 7300.

The coaters 1910 and 1920 each coat a collector body with the positive electrode slurry after the removal of impurities from the positive electrode slurry by the filter 1800. As such a collector body, a sheet or the like such as a metal foil having sufficient electrical conductivity may be employed. The material or the size thereof is not restricted in particular. Preferably, an aluminum foil or a copper foil may be employed.

Figure 13:
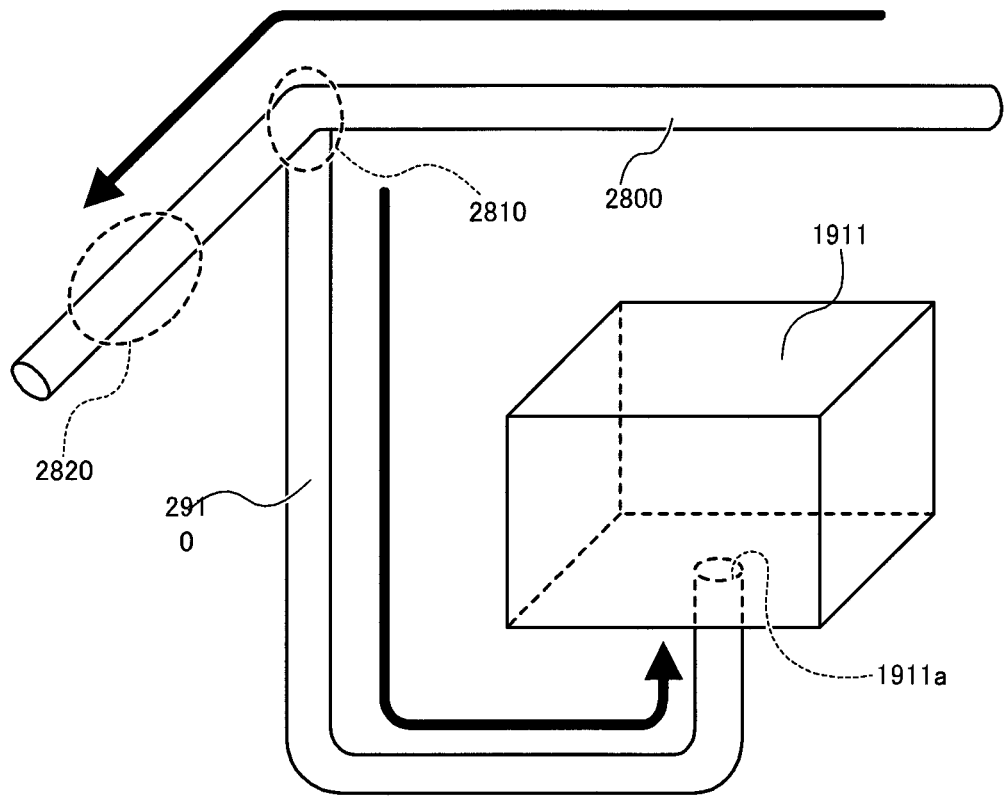
FIG. 13 is a diagram showing a connection relation between a circulation pipe, a pipe, and a coater included in the battery electrode slurry processing apparatus according to the third embodiment of the present invention.

FIG. 13 is a perspective view showing the coater 1910, the circulation pipe 2800, and the pipe 2910. In FIG. 13, each arrow indicates the direction in which the positive electrode slurry flows. The pipe 2910 is arranged such that one end thereof communicates with an elbow portion 2810, which is a bent portion of the circulation pipe 2800 structured in the form of a loop. Furthermore, the pipe 2910 is arranged such that the other end thereof communicates with a storage tank 1911 provided to the coater 1910 via a through hole 1911a formed in the bottom face of the storage tank 1911.

The positive electrode slurry that flows through the internal space of the circulation pipe 2800 collides with the inner wall of the circulation pipe 2800 at the elbow portion 2810. This arrangement weakens the flow of the positive electrode slurry. Accordingly, this allows the positive electrode slurry flowing through the internal space of the circulation pipe 2800 to easily flow into the pipe 2910. The positive electrode slurry that has flowed to the pipe 2910 further flows to the internal space of the storage tank 1911 via the bottom face of the storage tank 1922. The coater 1910 coats a collector body with the positive electrode slurry stored in the storage tank 1911 as described above.

The coater 1920, the circulation pipe 2800, and the pipe 2920 are arranged such that they communicate with each other as with the aforementioned arrangement comprising the coater 1910, the circulation pipe 2800, and the pipe 2910. The positive electrode slurry is transferred in the same manner as the aforementioned arrangement comprising the coater 1910, the circulation pipe 2800, and the pipe 2910.

It should be noted that the space defined so as to allow the binder supply unit 1100, the positive electrode material supply unit 1200, and the conductive additive supply unit 1300, each of which is a start point, and the storage tank 1911 of the coater 1910 and the storage tank of the coater 1920, each of which is an end point, to communicate with each other, is sealed. Furthermore, a space control unit 3100 is arranged such that it communicates with the sealed space. The space control unit 3100 sets the aforementioned space to a reduced pressure state or otherwise a state in which the space is filled with an inert gas. As such an inert gas, nitrogen gas may be employed, for example.

It should be noted that an organic solvent binder exhibits high hygroscopicity. Accordingly, such an organic solvent binder readily absorbs water in the atmosphere. This leads to the potential for adverse effects on quality due to the absorbed water. In order to avoid such a problem, in a case of employing such an organic solvent binder, the space control operation of the space control unit 3100 is particularly effective.

On the other hand, an aqueous binder, by its nature, contains water. Accordingly, the effects on such an aqueous binder due to water in the atmosphere are small as compared with those on an organic solvent binder. Accordingly, in a case in which such an aqueous binder is employed as the aforementioned binder, this arrangement does not necessarily require the space control operation of the space control unit 3100. However, in order to stabilize the temperature as a main purpose, the space control unit 3100 may perform a space control operation so as to introduce a temperature control gas to the space.

The battery electrode slurry processing apparatus 1000 having the aforementioned configuration provides the following advantages.

With the battery electrode slurry processing apparatus 1000, the binder is supplied to the preliminary kneading unit 1400 by the binder supply unit 1100 and the pipe 2100. The positive-electrode active material is supplied to the preliminary kneading unit 1400 by the positive electrode material supply unit 1200 and the pipe 2200. The conductive additive is supplied to the preliminary kneading unit 1400 by the conductive additive supply unit 1300 and the pipe 2300. The preliminary kneading unit 1400 performs coarse kneading of the multiple materials thus supplied. The preliminary kneaded slurry thus coarsely kneaded is supplied to the main kneading unit 1500 by the pipe 2400. The main kneading unit 1500 performs the main kneading of the preliminary kneaded slurry. With this arrangement, the preliminary kneading unit 1400 receives the supply of these multiple materials and supplies the mixture of the materials thus coarsely kneaded to the main kneading unit 1500 while performing coarse kneading of the multiple materials. That is to say, the preliminary kneading unit 1400 is capable of supplying the mixture of the coarsely kneaded materials and concurrently performing coarse kneading of the newly supplied multiple materials. Accordingly, this arrangement allows the preliminary kneaded slurry to be continuously supplied to the main kneading unit 1500. This allows the main kneading unit 1500 to continuously perform the main kneading. Accordingly, there is no need to suspend the operations of the downstream stages of the preliminary kneading unit 1400. This allows the positive electrode slurry to be continuously obtained in a short period of time.

Furthermore, the battery electrode slurry processing apparatus 1000 allows the preliminary kneaded slurry to be continuously supplied to the main kneading unit 1500 as described above. Accordingly, there is no need to replace the large pan. This allows the number of steps required for the positive electrode slurry manufacturing to be reduced.

Furthermore, the battery electrode slurry processing apparatus 1000 allows the preliminary kneaded slurry to be continuously supplied to the main kneading unit 1500 as described above. Accordingly, there is no need to knead a large amount of materials at one time. This allows the preliminary kneading unit 1400 to have a compact size, thereby allowing the battery electrode slurry processing apparatus 1000 to have a compact size.

Furthermore, with the battery electrode slurry processing apparatus 1000, the Mohno pump 5100 applies pressure to the binder transferred via the pipe 2100. The preliminary kneaded slurry is discharged from the preliminary kneading unit 1400. The slurry subjected to the main kneading is discharged from the main kneading unit 1500. The Mohno pump 7300 applies pressure to the positive electrode slurry transferred via the circulation pipe 2800. With this arrangement, the materials to be supplied to each unit or otherwise to be discharged from each unit are transferred in the battery electrode slurry processing apparatus 1000 using the pressures applied by the Mohno pumps 5100 and 7300 and the discharge pressures applied by the preliminary kneading unit 1400 and the main kneading unit 1500. Accordingly, this arrangement provides fully automated positive electrode slurry manufacturing.

Furthermore, the positive electrode slurry discharged from the main kneading unit 1500 is supplied to the circulation pipe 2800 via the pipe 2500. The positive electrode slurry thus supplied is circulated through the circulation pipe 2800. Moreover, the coaters 1910 and 1920 are connected to the circulation pipe 2800 via the pipes 2910 and 2920, respectively. With this arrangement, the positive electrode slurry thus subjected to the main kneading by the main kneading unit 1500 is supplied to the coaters 1910 and 1920 via the pipe 2500, the circulation pipe 2800, and the pipes 2910 and 2920. Accordingly, by operating both the coaters 1910 and 1920, this arrangement allows the multiple lines to perform the battery electrode manufacturing using the positive electrode slurry obtained by the battery electrode slurry processing apparatus 1000. This provides improved battery electrode production capacity. Furthermore, this arrangement allows the user to perform cleaning or maintenance for one from among the coaters 1910 and 1920 in a simple manner in a state in which the operation of the corresponding coater is suspended while operating the other coater so as to continue the battery electrode manufacturing. This provides improved battery electrode production capacity.

Furthermore, the positive electrode slurry thus subjected to the main kneading by the main kneading unit 1500 is circulated through the circulation pipe 2800 over a period before it is supplied to the coater 1910 or 1920 after it passes through the internal space of the pipe 2500. This arrangement allows the flow of the positive electrode slurry to be maintained over the aforementioned period. This prevents the occurrence of separation or sedimentation in the positive electrode slurry, thereby preventing degradation in the quality of the positive electrode slurry.

Furthermore, the pipes 2910 and 2920, which are respectively connected to the coaters 1910 and 1920, are connected to the elbow portions 2810 of the circulation pipe 2800 structured in the form of a loop. Accordingly, the positive electrode slurry circulated through the circulation pipe 2800 collides with the inner wall of the circulation pipe 2800 at the elbow portions 2810. This weakens the flow of the positive electrode slurry. This allows the positive electrode slurry circulated through the circulation pipe 2800 to easily flow into the pipes 2910 and 2920. Accordingly, there is no need to provide a region 2820 of the circulation pipe 2800 shown in FIG. 13 with a valve that controls the flow of the positive electrode slurry flowing through the internal space of the circulation pipe 2800, or to provide the pipes 2910 and 2920 with additional pumps. That is to say, this arrangement requires only a simple configuration to supply the positive electrode slurry to the coaters 1910 and 1920.

Furthermore, the pipe 2920 is arranged such that the other end thereof communicates with the storage tank 1911 of the coater 1910 via the through hole 1911a formed in the bottom face of the storage tank 1911. As with the pipe 2910, the pipe 2920 is arranged such that it communicates with the bottom face of the storage tank of the coater 1920. This arrangement is capable of preventing the positive electrode slurry from falling toward the bottom face of the storage tank 1911 or otherwise the bottom face of the storage tank 1920. Accordingly, this arrangement is capable of preventing the occurrence of bubbles in the positive electrode slurry due to high-speed collision of the positive electrode slurry with the bottom face of the storage tank 1911 or otherwise the bottom face of the storage tank 1920.

Furthermore, the circulation pipe 2800 is provided with the filter 1800. This arrangement is capable of removing impurities contained in the positive electrode slurry circulated through the internal space of the circulation pipe 2800.

Furthermore, with the battery electrode slurry processing apparatus 1000, the preliminary kneading unit 1400 sequentially performs coarse kneading of the binder, the positive-electrode active material, and the conductive additive, which are continuously supplied, and continuously discharges the mixture as the preliminary kneaded slurry. Furthermore, the throughput per unit of time of the preliminary kneading unit 1400 is designed such that it is equal to the sum total of the amounts of the multiple materials supplied to the preliminary kneading unit 1400 per unit of time. Thus, the sum total of the amounts of the multiple materials supplied to the preliminary kneading unit 1400 per unit of time is equal to the sum total of the amount of the preliminary kneaded slurry discharged from the preliminary kneading unit 1400 per unit of time. Accordingly, this arrangement allows the multiple materials supplied to the preliminary kneading unit 1400 to be continuously transferred to the main kneading unit 1500 without involving multiple materials remaining in the pipes 2100 through 2300 and the preliminary kneading unit 1400.

Furthermore, with the battery electrode slurry processing apparatus 1000, the main kneading unit 1500 sequentially performs the main kneading of the continuously supplied preliminary kneaded slurry, and continuously discharges the mixture as the positive electrode slurry. Moreover, the throughput per unit of time of the main kneading unit 1500 is designed such that it is equal to the throughput per unit of time of the preliminary kneading unit 1400. This arrangement is capable of performing the main kneading of the preliminary kneaded slurry discharged from the preliminary kneading unit 1400, and of discharging the positive electrode slurry without involving preliminary kneaded slurry remaining in the pipe 2400 or the main kneading unit 1500.

Furthermore, with the battery electrode slurry processing apparatus 1000, the space defined so as to allow the binder supply unit 1100, the positive electrode material supply unit 1200, and the conductive additive supply unit 1300, each of which is an initial point, and the storage tank 1911 of the coater 1910 and the storage tank of the coater 1920, each of which is a terminal point, to communicate with each other, is sealed. The space control unit 3100 sets the aforementioned space to a reduced pressure state or otherwise a state in which the space is filled with an inert gas. This arrangement is capable of suppressing the exposure of the materials and the positive electrode slurry to the atmosphere in a period from a step in which the materials are fed to the binder supply unit 1100, the positive electrode material supply unit 1200, and the conductive additive supply unit 1300, up to a step in which a collector body is coated with the positive electrode slurry stored in the storage tank 1911 or otherwise the storage tank of the coater 1920. Accordingly, this provides improved stability of the quality of the positive electrode slurry. Furthermore, this arrangement allows the coaters 1910 and 1920 to perform stable coating processing regardless of the state of the positive electrode slurry thus formed.

Fourth Embodiment

Figure 14:
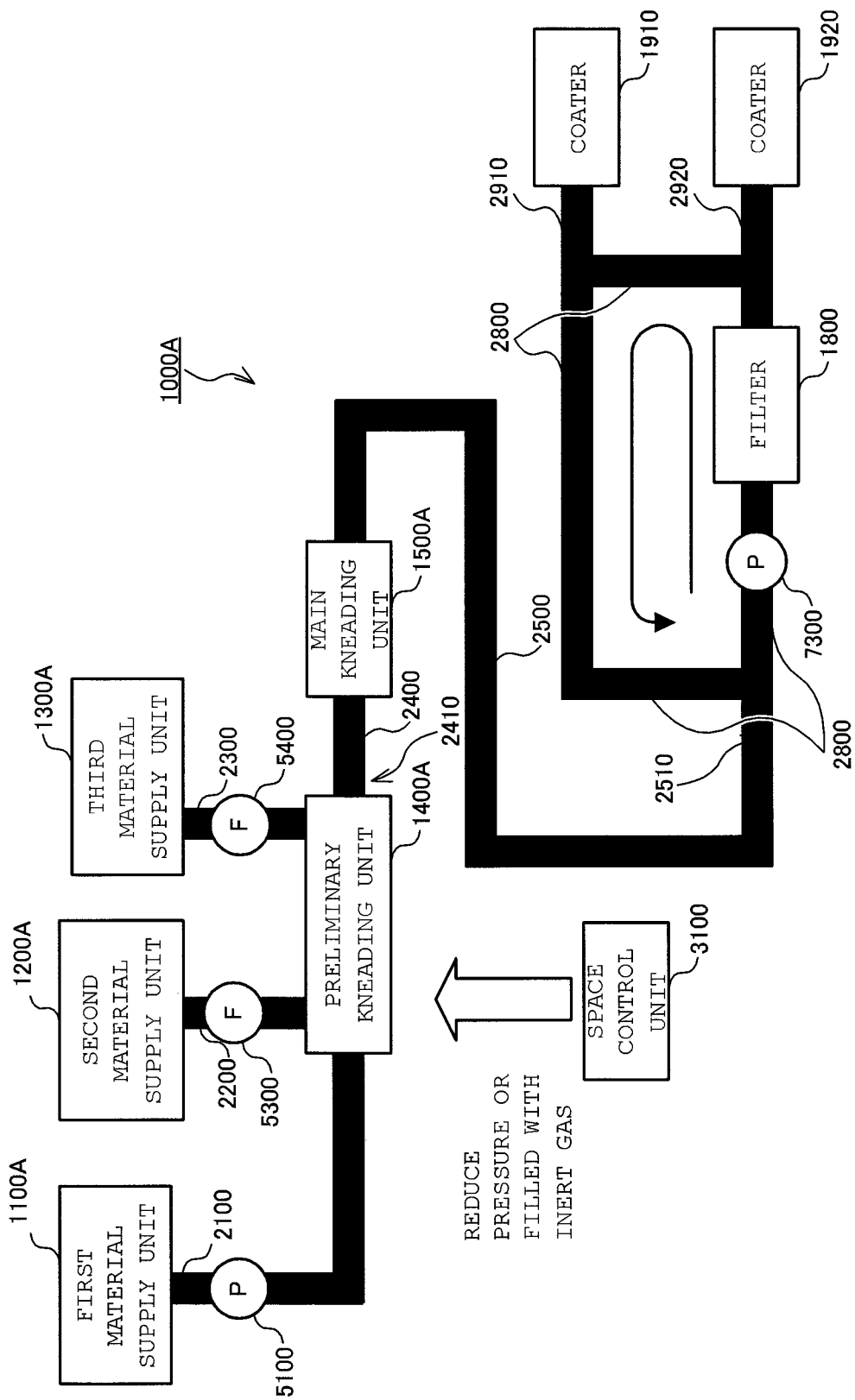
FIG. 14 is a configuration diagram showing a schematic configuration of a manufacturing apparatus according to a fourth embodiment of the present invention.

FIG. 14 is a configuration diagram showing a schematic configuration of a manufacturing apparatus 1000A according to a fourth embodiment of the present invention. The forming apparatus 1000A is an apparatus configured to mix multiple materials, i.e., a first material, a second material, and a third material, so as to form a slurry, and to manufacture a product using the slurry thus formed. The point of difference between the manufacturing apparatus 1000A and the battery electrode slurry processing apparatus 1000 according to the third embodiment of the present invention shown in FIG. 7 is that the manufacturing apparatus 1000A includes a first material supply unit 1100A which is a substitution for the binder supply unit 1100, a second material supply unit 1200A which is a substitution for the positive electrode material supply unit 1200, and a third material supply unit 1300A which is a substitution for the conductive additive supply unit 1300, a preliminary mixing unit 1400A which is a substitution for the preliminary kneading unit 1400, and a main mixing unit 1500A which is a substitution for the main kneading unit 1500. It should be noted that, in the manufacturing apparatus 1000A, the same components as those of the battery electrode slurry processing apparatus 1000 are denoted by the same reference symbols, and description thereof will be omitted.

The first material is stored in the first material supply unit 1100A. The pipe 2100 is arranged such that it communicates with the first material supply unit 1100A. The first material supply unit 1100A continuously supplies the first material to the pipe 2100.

The second material is stored in the second material supply unit 1200A. The pipe 2200 is arranged such that it communicates with the second material supply unit 1200A. The second material supply unit 1200A continuously supplies the second material to the pipe 2200.

The third material is stored in the third material supply unit 1300A. The pipe 2300 is arranged such that it communicates with the third material supply unit 1300A. The third material supply unit 1300A continuously supplies the third material to the pipe 2300.

The preliminary mixing unit 1400A is arranged such that it communicates with the pipes 2100 through 2300. The preliminary mixing unit 1400A has the same configuration as that of the preliminary kneading unit 1400 according to the third embodiment of the present invention shown in FIG. 8. The preliminary mixing unit 1400A sequentially performs coarse mixing of the first material, the second material, and the third material, which are continuously supplied, and continuously discharges the mixture as a preliminary mixed slurry. The main mixing unit 1500A is arranged such that it communicates with the preliminary mixing unit 1400A via the pipe 2400. The preliminary mixed slurry continuously discharged from the preliminary mixing unit 1400A is continuously supplied to the main mixing unit 1500A via the pipe 2400 by the pressure applied to the first material from the Mohno pump 5100 and the discharge pressure applied from the preliminary mixing unit 1400A.

With this arrangement, the preliminary mixing unit 1400A continuously receives the supply of these materials and continuously supplies the preliminary mixed slurry to the main mixing unit 1500 while performing the coarse mixing of the first material, the second material, and the third material. That is to say, the preliminary mixing unit 1400A continuously supplies the preliminary mixed slurry to the main mixing unit 1500A and concurrently performs the coarse mixing of the newly supplied materials.

The main mixing unit 1500A has the same configuration as that of the main kneading unit 1500 according to the third embodiment of the present invention shown in FIG. 11. The main mixing unit 1500A sequentially performs main mixing of the continuously supplied preliminary mixed slurry, and continuously discharges the mixture as a slurry. The coaters 1910 and 1920 are arranged such that they communicate with the main mixing unit 1500A via the pipe 2500, the circulation pipe 2800, and the pipes 2910 and 2920. The slurry continuously discharged from the main mixing unit 1500A is continuously supplied to the circulation pipe 2800 by the discharge pressure applied from the main mixing unit 1500A. Furthermore, the slurry is continuously supplied to the coaters 1910 and 1920 via the pipes 2910 and 2920, respectively, by the pressure applied from the Mohno pump 7300 to the slurry supplied to the circulation pipe 2800.

With this arrangement, the main mixing unit 1500A continuously receives the supply of the preliminary mixed slurry and continuously supplies the slurry to the coaters 1910 and 1920 while performing the main mixing of the preliminary mixed slurry. That is to say, the main mixing unit 1500A continuously supplies the slurry to the coaters 1910 and 1920, and concurrently continuously mixes the newly supplied preliminary mixed slurry.

The manufacturing apparatus 1000A having the aforementioned configuration provides the same effects as those provided by the battery electrode slurry processing apparatus 1000 even in a case of forming a slurry to be used for various kinds of products that differ from the battery electrodes. It should be noted that the slurry thus formed is to be used for products that differ from the battery electrodes. Accordingly, the slurry discharged from the main mixing unit 1500A is not necessarily supplied to the coaters 1910 and 1920. Also, the slurry may be supplied to other apparatuses or the like that correspond to the usage. Also, this arrangement does not necessarily require the filter 1800. Rather, determination of whether or not the filter 1800 is to be provided may be determined as appropriate according to the usage.

Fifth Embodiment

Figure 15:
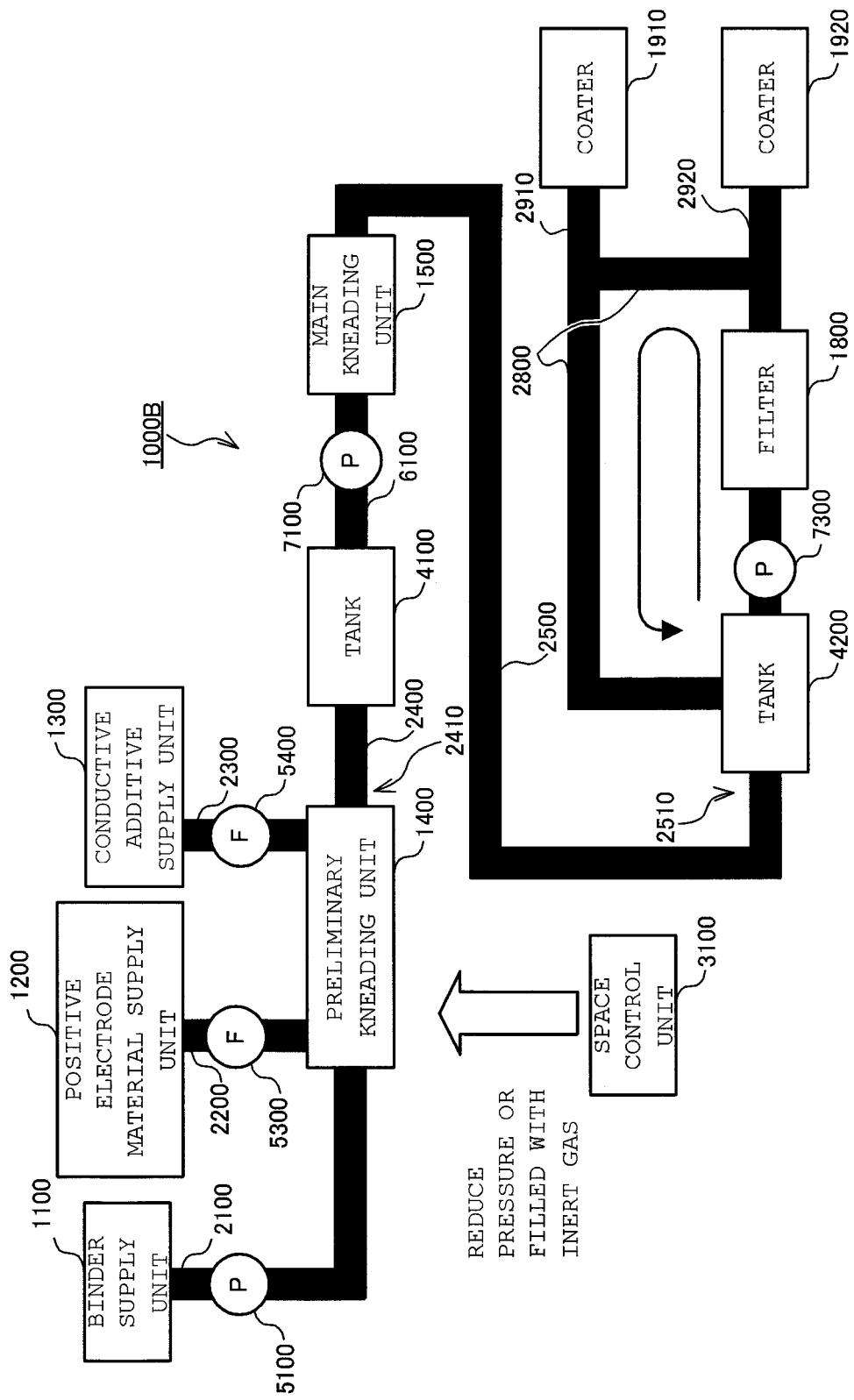
FIG. 15 is a configuration diagram showing a schematic configuration of a battery electrode slurry processing apparatus according to a fifth embodiment of the present invention.

FIG. 15 is a configuration diagram showing a schematic configuration of a battery electrode slurry processing apparatus 1000B according to a fifth embodiment of the present invention. The point of difference between the battery electrode slurry processing apparatus 1000B and the battery electrode slurry processing apparatus 1000 according to the third embodiment of the present invention shown in FIG. 7 is that the battery electrode slurry processing apparatus 1000B includes tanks 4100 and 4200, a pipe 6100, and a Mohno pump 7100. It should be noted that, in the battery electrode slurry processing apparatus 1000B, the same components as those of the battery electrode slurry processing apparatus 1000 are denoted by the same reference symbols, and description thereof will be omitted.

The tank 4100 is arranged such that it communicates with the pipe 2400 that communicates with the preliminary kneading unit 1400. The tank 4100 stores the preliminary kneaded slurry continuously supplied from the preliminary kneading unit 1400 via the pipe 2400.

The pipe 6100 is arranged such that it communicates with the tank 4100. The tank 4100 continuously supplies the stored preliminary kneaded slurry to the pipe 6100. Furthermore, the pipe 6100 is arranged such that it communicates with the main kneading unit 1500. Moreover, the pipe 6100 is provided with the Mohno pump 7100. The tank 4100 continuously supplies the stored preliminary kneaded slurry to the pipe 6100. The Mohno pump 7100 applies pressure to the preliminary kneaded slurry supplied to the pipe 6100 toward the main kneading unit 1500. Description will be made below with reference to FIG. 16 regarding an example configuration of the tank 4100.

Figure 16:
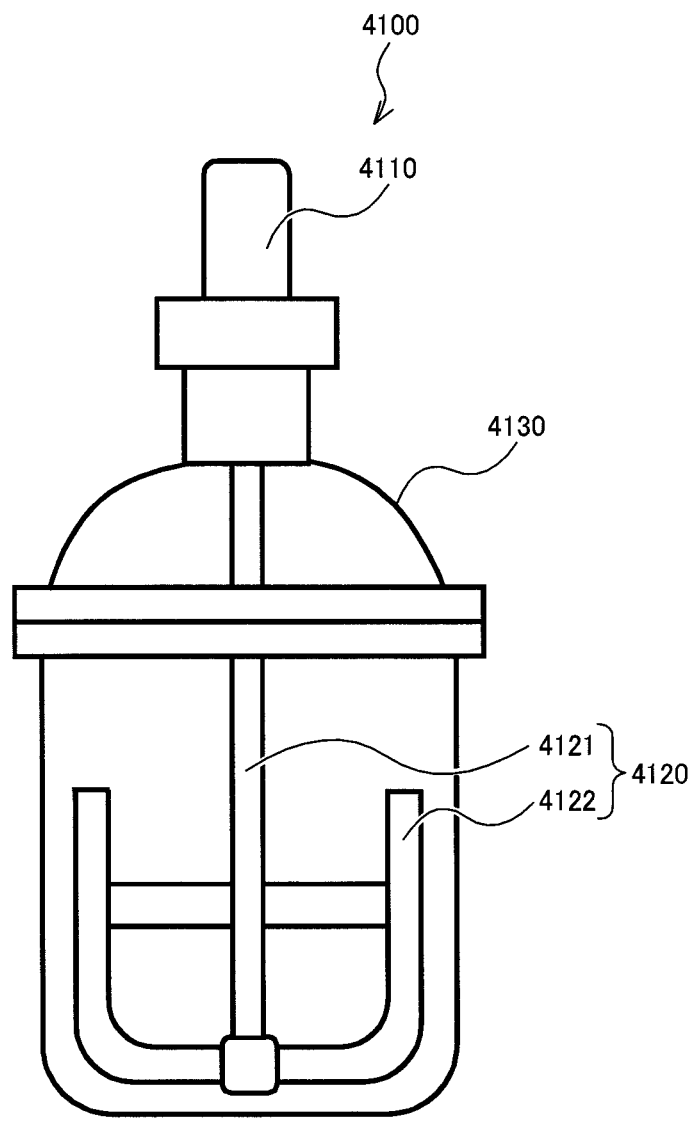
FIG. 16 is a cross-sectional diagram showing a schematic configuration of a tank included in the battery electrode slurry processing apparatus according to the fifth embodiment of the present invention.

FIG. 16 is a cross-sectional diagram showing a schematic configuration of the tank 4100. The tank 4100 includes a motor 4110, a stirrer 4120, and a casing 4130. The stirrer 4120 is configured as a so-called anchor stirrer including a rotor shaft 4121 and stirring vanes 4122. The rotor shaft 4121 is rotationally driven by the motor 4110 with the longitudinal center line of the rotor shaft 4121 as the axis of rotation. By rotationally driving the rotor shaft 4121, this arrangement rotationally drives the stirring vanes 4122. With the tank 4100, by driving the motor 4110 so as to rotationally drive the stirring vanes 4122, the stored preliminary kneaded slurry is stirred. It should be noted that the preliminary kneaded slurry is input to the internal space of the tank 4100 via the inner wall of the tank 4100 from an inlet (not shown) provided to the side wall of the tank 4100. In a case in which the positive electrode slurry is input from the upper side of the tank 4100, this arrangement has the potential to involve bubbles being contained in the slurry.

The aforementioned arrangement is designed in order to avoid such a problem. Furthermore, the preliminary kneaded slurry stored in the tank 4100 is discharged via an outlet (not shown) provided to the bottom face of the tank 4100.

The tank 4200 is connected to the pipe 2500 and the circulation pipe 2800. The tank 4200 has the same configuration as that of the tank 4100. The tank 4200 stores the positive electrode slurry continuously supplied from the main kneading unit 1500 via the pipe 2500 and the positive electrode slurry circulated through the internal space of the circulation pipe 2800, stirs the positive electrode slurry thus stored, and continuously supplies the stored positive electrode slurry to the circulation pipe 2800.

The tank 4200 continuously supplies the stored positive electrode slurry to the circulation pipe 2800. The Mohno pump 7300 applies pressure to the positive electrode slurry supplied to the circulation pipe 2800 toward the filter 1800.

The aforementioned battery electrode slurry processing apparatus 1000B provides the following advantages in addition to the aforementioned advantages that can be provided by the battery electrode slurry processing apparatus 1000.

The preliminary kneading unit 1400 is designed to receive the supply of the binder, the positive-electrode active material, and the conductive additive with a predetermined mixture ratio from the binder supply unit 1100, the positive electrode material supply unit 1200, and the conductive additive supply unit 1300. However, in some cases, slight, non-negligible variation may occur in the quality of the preliminary kneaded slurry subjected to the coarse kneading by the preliminary kneading unit 1400 and continuously discharged, which is due to the feeding timing, measurement error, effects that occur due to the transfer (transfer speed, transfer timing, transfer amount, etc.), etc. However, the battery electrode slurry processing apparatus 1000B includes the tank 4100 between the preliminary kneading unit 1400 and the main kneading unit 1500. With this arrangement, after the preliminary kneaded slurry subjected to the coarse kneading by the preliminary kneading unit 1400 and continuously discharged is stored in the tank 4100, the preliminary kneaded slurry is supplied to the main kneading unit 1500. Accordingly, the preliminary kneaded slurry thus subjected to the coarse kneading by the preliminary kneading unit 1400 is mixed while the stored preliminary kneaded slurry is stored in the tank 4100. Thus, in the stage in which the preliminary kneaded slurry is supplied to the main kneading unit 1500, variation in the quality of the preliminary kneaded slurry is small as compared with that in a stage immediately after it is discharged from the preliminary kneading unit 1400. This arrangement provides improved uniformity of the quality of the positive electrode slurry.

Furthermore, with the battery electrode slurry processing apparatus 1000B, the tank 4100 is provided with the stirrer 4120 that stirs the preliminary kneaded slurry stored in the tank 4100. With this arrangement, the preliminary kneaded slurry subjected to the coarse kneading by the preliminary kneading unit 1400 is mixed while it is stored in the tank 4100. This allows the preliminary kneaded slurry to be maintained in a state in which the multiple materials are kneaded without the separation of the materials that form the preliminary kneaded slurry dispersed by the coarse kneading. This arrangement provides further improved uniformity of the quality of the positive electrode slurry.

Furthermore, with the battery electrode slurry processing apparatus 1000B, the tank 4100 is provided between the preliminary kneading unit 1400 and the main kneading unit 1500. Accordingly, in a case in which there is a difference in the throughput between the preliminary kneading unit 1400 and the main kneading unit 1500, the tank 4100 may be used as a so-called buffer. This allows the same amount of the preliminary kneaded slurry as that of the throughput of the main kneading unit 1500 to be supplied to the main kneading unit 1500. Specifically, in a case in which the throughput of the preliminary kneading unit 1400 is smaller than the throughput of the main kneading unit 1500, the difference between them is compensated for by the preliminary kneaded slurry stored in the tank 4100. This allows the same amount of the preliminary kneaded slurry as that of the throughput of the main kneading unit 1500 to be supplied to the main kneading unit 1500. Conversely, when the throughput of the preliminary kneading unit 1400 is larger than the throughput of the main kneading unit 1500, an amount of the preliminary kneaded slurry that corresponds to the difference between them is stored in the tank 4100. This allows the same amount of the preliminary kneaded slurry as that of the throughput of the main kneading unit 1500 to be supplied to the main kneading unit 1500. Accordingly, this arrangement allows the preliminary kneading unit 1400 and the main kneading unit 1500 to be independently operated as appropriate according to the target amount of the positive electrode slurry to be formed or otherwise a maintenance operation such as cleaning or the like while continuously supplying the preliminary kneaded slurry subjected to the coarse kneading by the preliminary kneading unit 1400 to the main kneading unit 1500.

Furthermore, the battery electrode slurry processing apparatus 1000B is provided with the tank 4200. With this arrangement, after the positive electrode slurry circulated through the internal space of the circulation pipe 2800 and the positive electrode slurry continuously supplied from the main kneading unit 1500 via the pipe 2500 are stored in the tank 4200, the positive electrode slurry is supplied to the coaters 1910 and 1920. Accordingly, the positive electrode slurry circulated through the internal space of the circulation pipe 2800 and the positive electrode slurry continuously supplied from the main kneading unit 1500 via the pipe 2500 are mixed while they are stored in the tank 4200. The mixture of the positive electrode slurry circulated through the internal space of the circulation pipe 2800 and the positive electrode slurry continuously supplied from the main kneading unit 1500 via the pipe 2500 provides reduced variation in quality. Thus, this arrangement provides further improved uniformity of the quality of the positive electrode slurry.

Furthermore, in the battery electrode slurry processing apparatus 1000B, the tank 4200 is provided with a stirrer configured to stir the stored positive electrode slurry. This arrangement allows the positive electrode slurry circulated through the internal space of the circulation pipe 2800 and the positive electrode slurry continuously supplied from the main kneading unit 1500 via the pipe 2500 to be further mixed while they are stored in the tank 4200. This arrangement is capable of maintaining the positive electrode slurry in a state in which the multiple materials are kneaded without separation of the materials that form the preliminary kneaded slurry dispersed by the coarse kneading and the main kneading. This arrangement provides further improved uniformity of the quality of the positive electrode slurry.

Furthermore, the battery electrode slurry processing apparatus 1000B is provided with the tank 4200. Accordingly, in a case in which there is a difference between the throughput of the main kneading unit 1500 and the sum total of the throughputs of the coaters 1910 and 1920, the tank 4200 can be used as a so-called buffer. This arrangement allows the same amount of the positive electrode slurry as the sum total of the throughputs of the coaters 1910 and 1920 to be supplied to the coaters 1910 and 1920. Accordingly, this arrangement is capable of independently operating the preliminary kneading unit 1400, the main kneading unit 1500, and the coaters 1910 and 1920 as appropriate according to the target amount of the positive electrode slurry to be formed or a maintenance operation such as cleaning or the like while continuously supplying the positive electrode slurry to the coaters 1910 and 1920.

Sixth Embodiment

Figure 17:
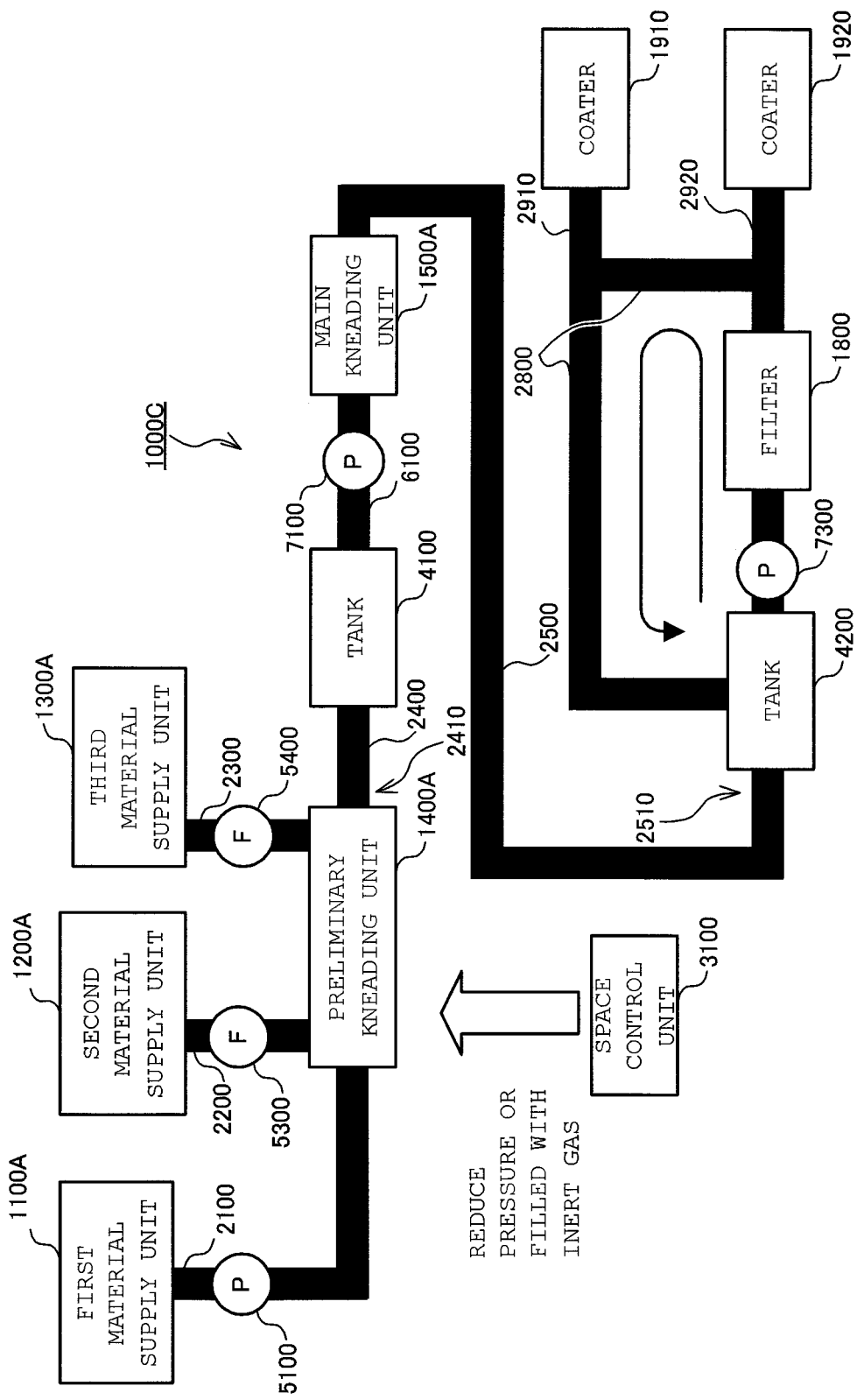
FIG. 17 is a configuration diagram showing a schematic configuration of a manufacturing apparatus according to a sixth embodiment of the present invention.

FIG. 17 is a configuration diagram showing a schematic configuration of a manufacturing apparatus 1000C according to a sixth embodiment of the present invention. The point in difference between the manufacturing apparatus 1000C and the manufacturing apparatus 1000A according to the fourth embodiment of the present invention shown in FIG. 14 is that the manufacturing apparatus 1000C includes the tanks 4100 and 4200, the pipe 6100, and the Mohno pump 7100. It should be noted that, in the manufacturing apparatus 1000C, the same components as those of the manufacturing apparatus 1000A are denoted by the same reference symbols, and description thereof will be omitted.

The tank 4100, the pipe 6100, and the Mohno pump 7100 are arranged between the main kneading unit 1500A and the pipe 2400 that communicates with the preliminary kneading unit 1400A in the same manner as in the aforementioned fifth embodiment including the tank 4100, the pipe 6100, and the Mohno pump 7100. The tank 4100, the pipe 6100, and the Mohno pump 7100 in the present embodiment provide the same function as that of the tank 4100, the pipe 6100, and the Mohno pump 7100 according to the fifth embodiment. Furthermore, the tank 4200 and the Mohno pump 7300 are provided to the circulation pipe 2800 in the same manner as the aforementioned fourth embodiment including the tank 4200 and the Mohno pump 7300. The tank 4200 and the Mohno pump 7300 in the present embodiment provide the same function as that provided by the tank 4200 and the Mohno pump 7300 according to the aforementioned fifth embodiment.

The manufacturing apparatus 1000C described above provides the same advantages as those that can be provided by the battery electrode slurry processing apparatus 1000B according to the fifth embodiment of the present invention shown in FIG. 15, in addition to the aforementioned advantages that can be provided by the manufacturing apparatus 1000A.

It should be noted that although detailed description has been made regarding the embodiment of the present invention with reference to the drawings, specific configurations thereof are not restricted to this embodiment. Rather, various changes of design may be made, which are encompassed by the present invention without departing from the spirit or scope of the appended claims.

Figure 20:
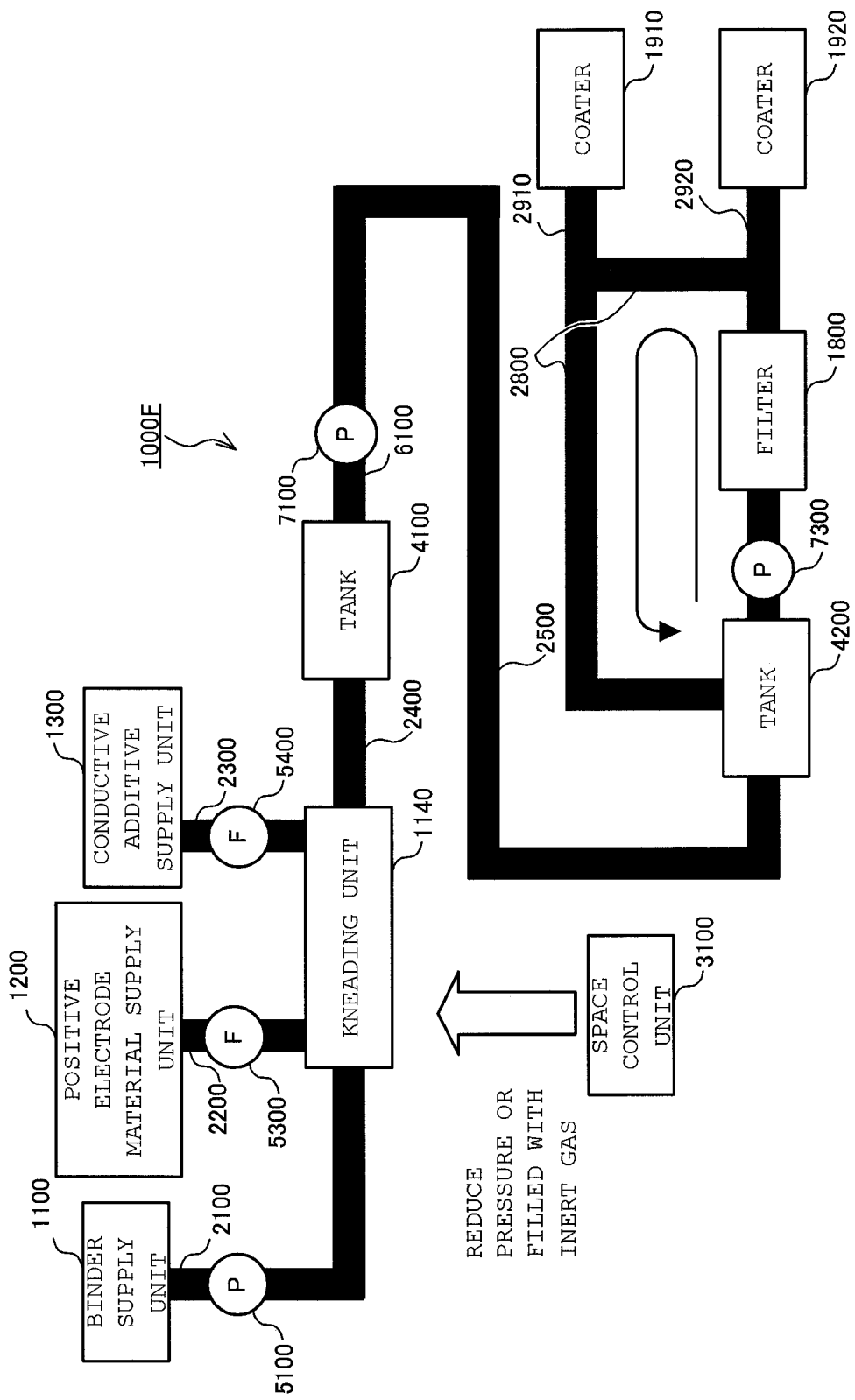
FIG. 20 is a configuration diagram showing a schematic configuration of a battery electrode slurry processing apparatus including a single kneading unit instead of the two kneading units, i.e., the preliminary kneading unit and the main kneading unit according to the fifth embodiment.

For example, description has been made in the third embodiment and the fifth embodiment regarding an arrangement comprising two kneading units, i.e., the preliminary kneading unit 1400 and the main kneading unit 1500. Also, three or more kneading units may be provided. Also, only a single kneading unit may be provided as shown in FIGS. 18 and 20, for example.

Figure 18:
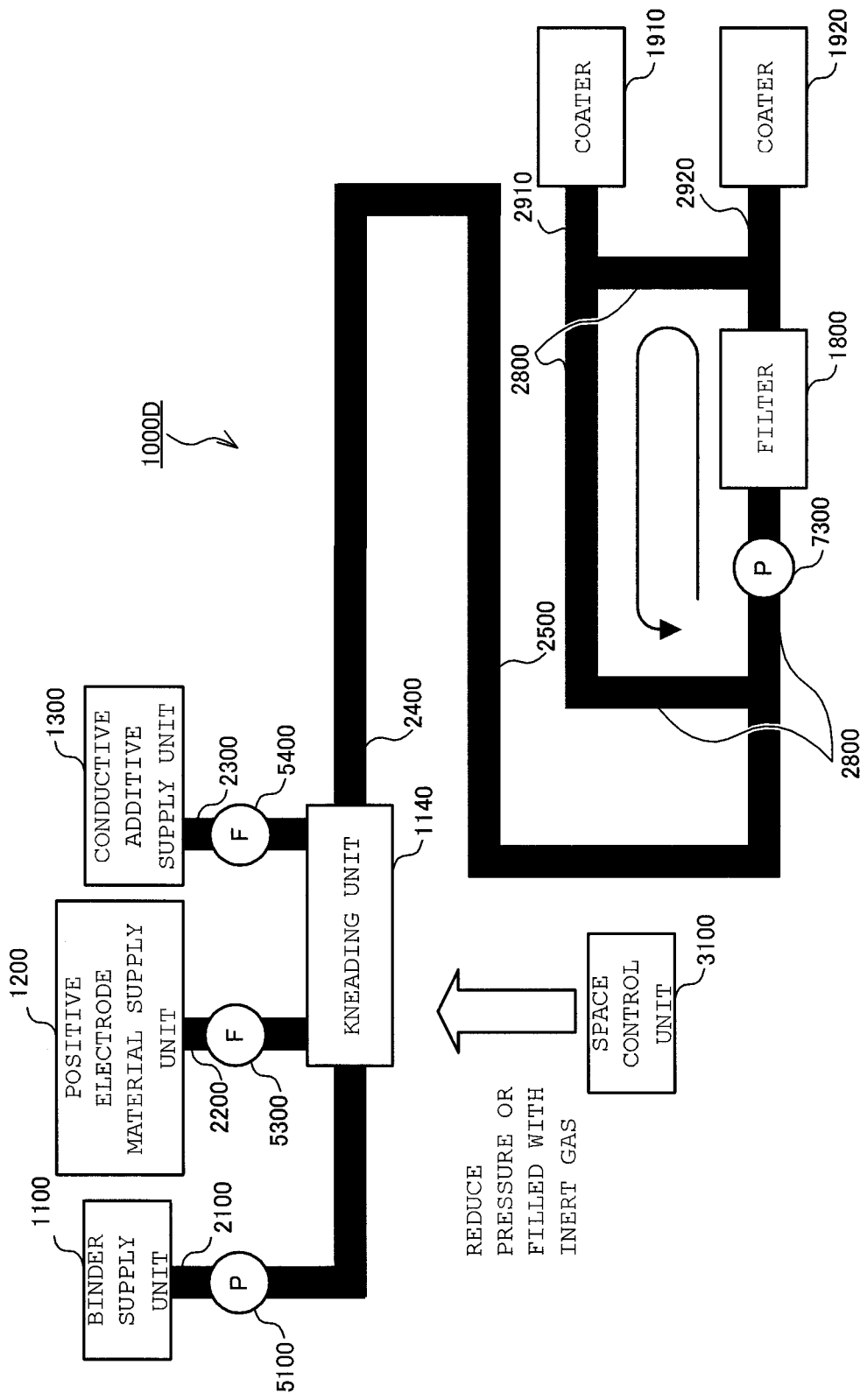
FIG. 18 is a configuration diagram showing a schematic configuration of a battery electrode slurry processing apparatus including a single kneading unit instead of the two kneading units, i.e., the preliminary kneading unit and the main kneading unit, according to the third embodiment of the present invention.

The point of difference between a battery electrode slurry processing apparatus 1000D shown in FIG. 18 and the battery electrode slurry processing apparatus 1000 according to the third embodiment of the present invention shown in FIG. 7 is that the battery electrode slurry processing apparatus 1000D includes a single kneading unit 1140 instead of the preliminary kneading unit 1400 and the main kneading unit 1500. The point of difference between a battery electrode slurry processing apparatus 1000F shown in FIG. 20 and the battery electrode slurry processing apparatus 1000B according to the fifth embodiment of the present invention shown in FIG. 15 is that the battery electrode slurry processing apparatus 1000F includes a single kneading unit 1140 instead of the preliminary kneading unit 1400 and the main kneading unit 1500. The battery electrode slurry processing apparatuses 1000D and 1000F provide the same advantages as those provided by the battery electrode slurry processing apparatuses 1000 and 1000B, respectively.

Figure 21:
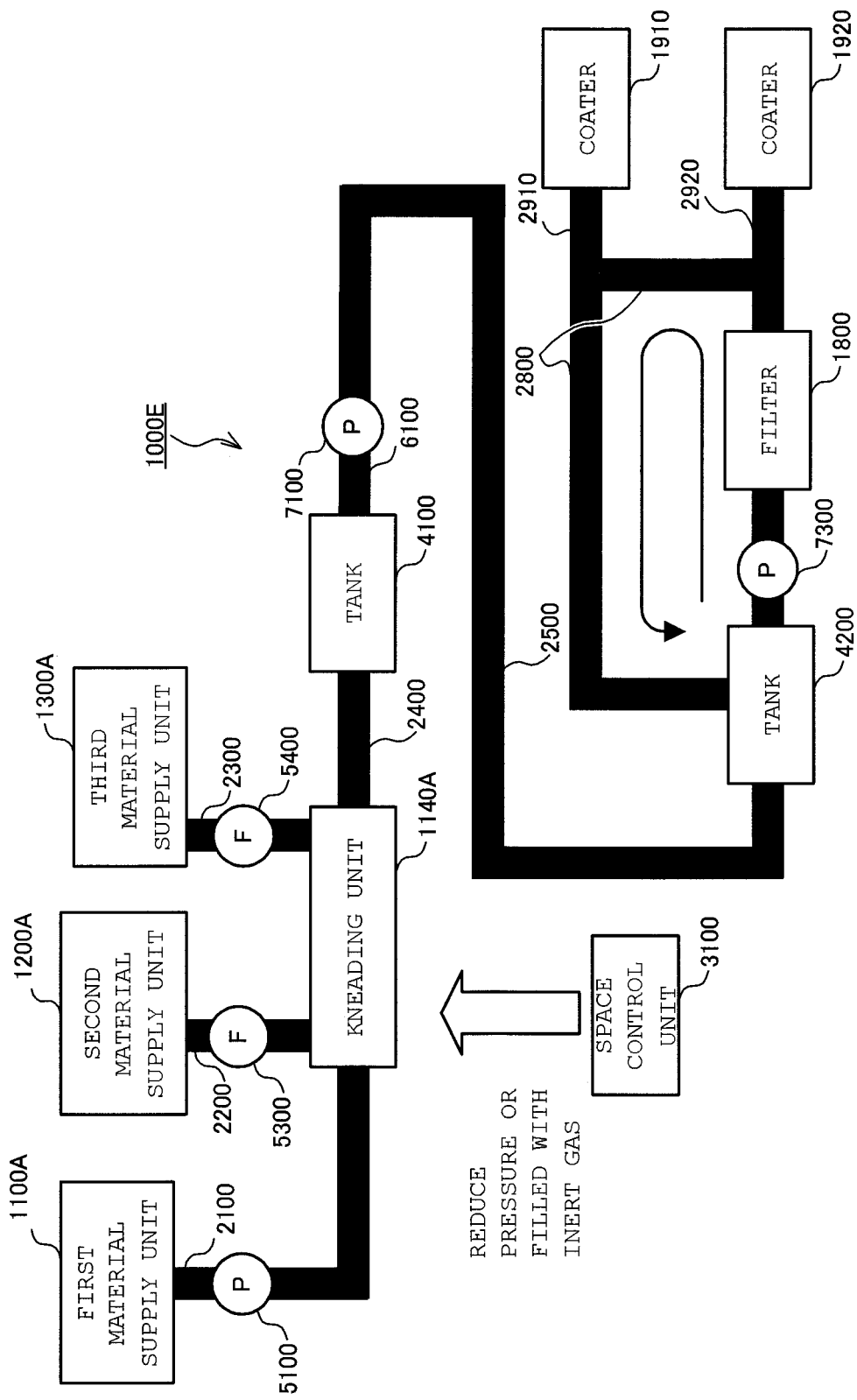
FIG. 21 is a configuration diagram showing a schematic configuration of a manufacturing apparatus including a single mixing unit instead of the two mixing units, i.e., the preliminary mixing unit and the main mixing unit according to the sixth embodiment.

Description has been made in the fourth embodiment and the sixth embodiment regarding an arrangement including two mixing units, i.e., the preliminary mixing unit 1400A and the main mixing unit 1500A. Also, three or more mixing units may be provided. For example, a single mixing unit may be provided as shown in FIGS. 19 and 21.

Figure 19:
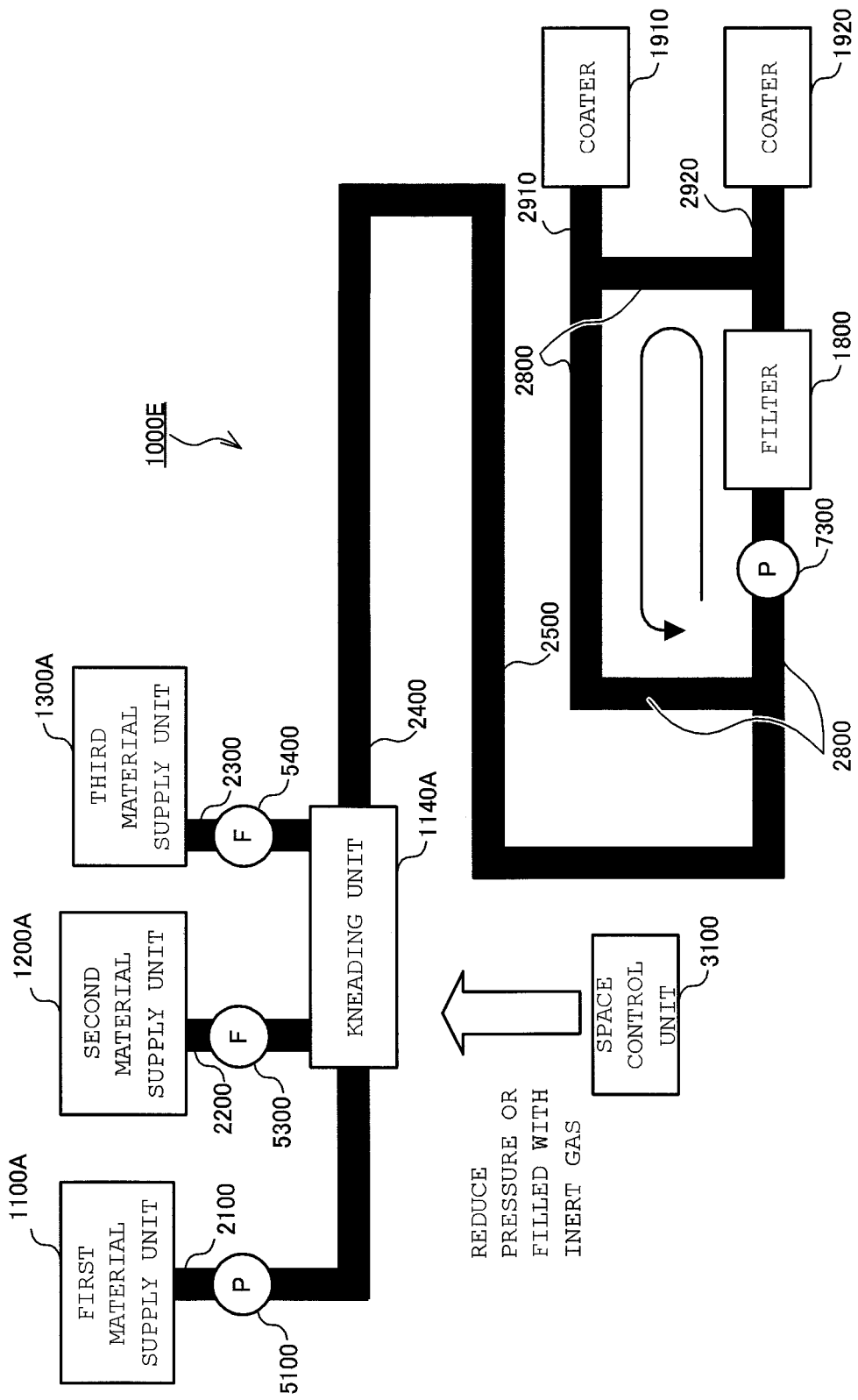
FIG. 19 is a configuration diagram showing a schematic configuration of a manufacturing apparatus including a single mixing unit instead of the two mixing units, i.e., the preliminary mixing unit and the main mixing unit according to the fourth embodiment.

The point of difference between a manufacturing apparatus 1000E shown in FIG. 19 and the manufacturing apparatus 1000A according to the fourth embodiment of the present invention shown in FIG. 8 is that the manufacturing apparatus 1000E includes a mixing unit 1140A instead of the preliminary mixing unit 1400A and the main mixing unit 1500A. The point of difference between a manufacturing apparatus 1000G shown in FIG. 21 and the manufacturing apparatus 1000C according to the sixth embodiment of the present invention shown in FIG. 17 is that the manufacturing apparatus 1000G includes a mixing unit 1140A instead of the preliminary mixing unit 1400A and the main mixing unit 1500A. The manufacturing apparatuses 1000E and 1000G provide the same advantages as those provided by the manufacturing apparatuses 1000A and 1000C, respectively.

Description has been made in each of the aforementioned embodiments regarding an arrangement in which two coaters, i.e., the coaters 1910 and 1920 are arranged such that they communicate with the circulation pipe 2800. However, the present invention is not restricted to such an arrangement. Also, three or four coaters may be arranged such that they communicate with the circulation pipe 2800.

Description has been made above in the third embodiment and the fifth embodiment regarding an example involving a positive electrode slurry. However, the present invention is not restricted to such an example. For example, the present invention is applicable to a negative electrode slurry.

Description has been made above in the third embodiment and the fifth embodiment regarding an arrangement in which all the materials to be kneaded are supplied to a first kneading unit such as the preliminary kneading unit 1400. However, the present invention is not restricted to such an arrangement. Also, such multiple materials to be kneaded may be supplied to multiple kneading units in a distributed manner.

Also, description has been made above in the fourth embodiment and the sixth embodiment regarding an arrangement in which all the materials to be mixed are supplied to a first mixing unit such as the preliminary mixing unit 1400A. However, the present invention is not restricted to such an arrangement. Also, such multiple materials to be mixed may be supplied to multiple mixing units in a distributed manner.

Description has been made in the third embodiment regarding an arrangement in which the supply of the binder from the binder supply unit 1100 to the preliminary kneading unit 1400 is performed by the Mohno pump 5100. However, the present invention is not restricted to such an arrangement. For example, a diaphragm pump, piston pump, plunger pump, Delasco pump, gear pump, vane pump, or the like may be employed. Also, the binder supply unit 1100 may be arranged at a position that is higher than that of the preliminary kneading unit 1400 so as to allow pressure to be applied to the binder using gravity. This arrangement also allows the binder to be supplied from the binder supply unit 1100 to the preliminary kneading unit 1400. It should be noted that in such a case of using gravity, the Mohno pump 5100 is preferably provided to the pipe 2100 in order to control the amount of material to be supplied.

Description has been made in the third embodiment regarding an arrangement in which the initial mixture transferred to the space surrounded by the base 1441 of the stator 1440, the base 1451 of the rotor 1450, and the lower comb-toothed blades 1452 is discharged from the third opening 1460c by the centrifugal force due to the rotation of the rotor 1450. However, the transfer force generated due to only the rotation of the rotor 1450 has the potential to be insufficient for discharging the initial mixture thus transferred to the aforementioned space from the third opening 1460c. In particular, as the length of the pipes 2100 through 2500 becomes larger, the potential for the transfer force to be insufficient becomes higher. In order to solve such a problem, a component such as a Mohno pump or the like configured to apply pressure to the material flowing through the internal space of the pipe may be provided to at least one from among the pipe 2400 and the pipe 2500.

Figure 22:
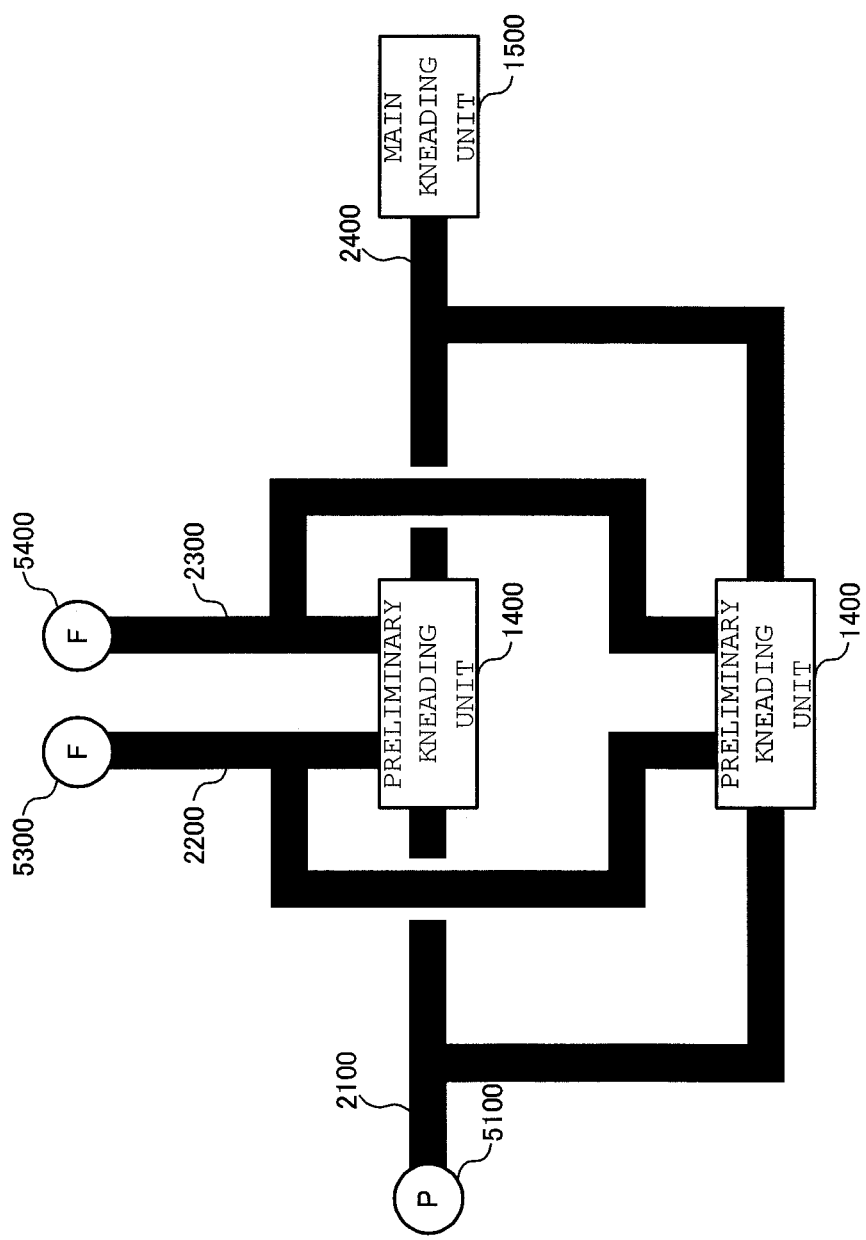
FIG. 22 is a diagram showing an example including multiple preliminary kneading units in parallel, each of which is configured according to the third embodiment of the present invention.

Description has been made in the third embodiment regarding an arrangement including the single preliminary kneading unit 1400. However, the present invention is not restricted to such an arrangement. For example, as shown in FIG. 22, multiple (in FIG. 22, two) preliminary kneading units may be arranged in parallel. This arrangement allows each of the multiple preliminary kneading units 1400 to be independently operated according to the target amount of the positive electrode slurry to be formed or a maintenance operation such as cleaning or the like.

Description has been made in the third embodiment regarding an arrangement including the single main kneading unit 1500. However, the present invention is not restricted to such an arrangement. For example, as with the arrangement including the multiple preliminary kneading units 1400, multiple main kneading units may be arranged in parallel. This arrangement allows each of the multiple main kneading units 1500 to be independently operated according to the target amount of the positive electrode slurry to be formed or a maintenance operation such as cleaning or the like.

As with the modifications of the third embodiment including multiple preliminary kneading units 1400 or multiple main kneading units 1500, modifications of the fourth embodiment and the sixth embodiment may be made in which the multiple preliminary mixing units 1400 or multiple main mixing units 1500 are arranged in parallel.

Also, for the third embodiment, a modification may be made in which the multiple preliminary kneading units 1400 are arranged in parallel as described above and the multiple main kneading units 1500 are arranged in parallel as described above. In this case, each of the preliminary kneading units 1400 and each of the main kneading units 1500 are independently controlled such that the sum total of the throughputs of the preliminary kneading units 1400 is equal to the sum total of the throughputs of the main kneading units 1500. This arrangement allows each of the preliminary kneading units 1400 and each of the main kneading units 1500 to be independently operated as appropriate according to the target amount of the positive electrode slurry to be formed or a maintenance operation such as cleaning or the like while continuously supplying the preliminary kneaded slurry kneaded by the preliminary kneading units 1400 to the main kneading units 1500.

Description has been made in the third embodiment regarding an arrangement in which the binder, the positive-electrode active material, and the conductive additive are respectively supplied from the binder supply unit 1100, the positive electrode material supply unit 1200, and the conductive additive supply unit 1300, i.e., from separate component units. However, the present invention is not restricted to such an arrangement. Also, the binder, the positive-electrode active material, and the conductive additive may be supplied from the same component unit.

Description has been made in the third embodiment regarding an arrangement in which the Mohno pump 5100 is provided to the pipe 2100. However, the present invention is not restricted to this arrangement. Also, the Mohno pump 5100 may be provided to any one of the pipe 2400, the pipe 2500, the circulation pipe 2800, the pipe 2910, and the pipe 2920. In a case in which the Mohno pump 5100 is provided to any one of the pipes 2400, 2500, 2910, and 2920, and the circulation pipe 2800, a component configured to apply pressure or the like is preferably provided so as to suction the slurry. Furthermore, in a case in which the Mohno pump 5100 is provided to the pipe 2400, additional pressure may preferably be applied to the materials in a period until the first preliminary kneaded slurry is discharged from the preliminary kneading unit 1400. In a case in which the Mohno pump 5100 is provided to the pipe 2500, additional pressure may preferably be applied to the materials in a period until the first positive electrode slurry is discharged from the main kneading unit 1500. In order to apply such additional pressure, the Mohno pump 5100 provided to the pipe 2100 may preferably apply such additional pressure to the binder. Otherwise, a pressure-applying component may preferably be provided to the preliminary kneading unit 1400 or otherwise the main kneading unit 1500 so as to apply a certain degree of pressure to the materials. By applying such additional pressure, this arrangement allows the materials and the slurry to be transferred more smoothly in the battery electrode slurry processing apparatus 1000.

Also, in the fourth embodiment, the first material may be prepared as a liquid material or otherwise a powder material. Also, the second material and the third material may each be prepared as a liquid material or otherwise a powder material.

Description has been made in each of the aforementioned embodiments regarding an arrangement in which three kinds of materials are supplied to the preliminary kneading unit 1400. However, the present invention is not restricted to such an arrangement. For example, two kinds of materials or four kinds of materials may be supplied.

DESCRIPTION OF THE REFERENCE NUMERALS

AA battery electrode slurry processing apparatus
1, 1A battery electrode slurry distributing apparatus
11, 12, 13 pipe
14 circulation pipe
21 tank
31 defoaming unit
41 filter
51, 52 Mohno pump 70 control unit
71, 72, 73 two-way valve
74 two-way valve control unit
81 disposal unit
91, 92 coater
100 battery electrode slurry forming apparatus
141 elbow portion
911 storage tank
1000, 1000B, 1000D, 1000F battery electrode slurry processing apparatus
1000A, 1000C, 1000E, 1000G manufacturing apparatus
1100 binder supply unit
1100A first material supply unit
1200 positive electrode material supply unit
1200A second material supply unit
1300 conductive additive supply unit
1300A third material supply unit
1400 preliminary kneading unit
1400A preliminary mixing unit
1500 main kneading unit
1500A main mixing unit
1800 filter
1910, 1920 coater
1911 storage tank
2100 through
2500, 6100, 2910, 2920 pipe
2800 circulation pipe
3100 space control unit
4100, 4200 tank, 5100, 7100, 7300 Mohno pump
1140 kneading unit
1140A mixing unit
2410 inlet
2510 outlet

What is claimed is:

1. A battery electrode slurry distributing method employed in a battery electrode slurry distributing apparatus configured to distribute a battery electrode slurry to a plurality of coating units each configured to coat a metal sheet used to manufacture a battery electrode with the battery electrode slurry, the battery electrode slurry distributing method comprising:
   a first step in which a battery electrode slurry is circulated through a circulation unit connected to the plurality of coating units in a state in which a pressure is applied to the battery electrode slurry; and
   a second step in which a supply of the battery electrode slurry circulated in the first step to each of the plurality of coating units is controlled.

2. The battery electrode slurry distributing method according to claim 1,
   wherein the circulation unit is structured in a polygonal loop,
   and wherein a plurality of connection units are coupled to respective multiple elbow portions formed in the circulation unit.

3. The battery electrode slurry distributing method according to claim 2,
   wherein in the second step, in a period in which any one from among the plurality of coating units is allowed to receive the supply of the battery electrode slurry, the supply of the battery electrode slurry to the remaining coating units other than the coating unit thus allowed to receive the supply of the battery electrode slurry is inhibited.

4. The battery electrode slurry distributing method according to claim 3,
   wherein a control unit comprises openable/closable valves each of which controls a flow of the battery electrode slurry at a corresponding one of the plurality of connection units,
   and wherein the control unit controls the plurality of valves such that two or more valves are not opened at the same time.

5. The battery electrode slurry distributing method according to claim 3,
   wherein the plurality of connection units includes a plurality of first storage units each connected to a bottom face of a corresponding connection unit,
   and wherein the plurality of first storage units each store the battery electrode slurry that flows to the corresponding connection unit.

6. The battery electrode slurry distributing method according to claim 2,
   wherein the plurality of connection units includes a plurality of first storage units each connected to a bottom face of a corresponding connection unit,
   and wherein the plurality of first storage units each store the battery electrode slurry that flows to the corresponding connection unit.

7. The battery electrode slurry distributing method according to claim 1,
   wherein in the second step, in a period in which any one from among the plurality of coating units is allowed to receive the supply of the battery electrode slurry, the supply of the battery electrode slurry to the remaining coating units other than the coating unit thus allowed to receive the supply of the battery electrode slurry is inhibited.

8. The battery electrode slurry distributing method according to claim 7,
   wherein the plurality of connection units includes a plurality of first storage units each connected to a bottom face of a corresponding connection unit,
   and wherein the plurality of first storage units each store the battery electrode slurry that flows to the corresponding connection unit.

9. The battery electrode slurry distributing method according to claim 1, wherein a removing unit removes impurities contained in the battery electrode slurry circulated through the circulation unit.

10. The battery electrode slurry distributing method according to claim 1, wherein a second storage unit stores the battery electrode slurry circulated through the circulation unit, and supplies the battery electrode slurry thus stored to the circulation unit.

11. The battery electrode slurry distributing method according to claim 1, wherein a disposal unit selectively performs disposal of at least a part of the battery electrode slurry circulated through the circulation unit.

12. A battery electrode slurry processing method employed in the battery electrode slurry distributing method according to claim 1, comprising:
   a first step in which a first supply unit supplies a plurality of materials to be used to form the battery electrode slurry;
   a second step in which a first transfer unit transfers the plurality of materials supplied from the first supply unit;
   a third step in which a first kneading unit kneads the multiple materials transferred by the first transfer unit, and that continuously discharges the kneaded materials;

a fourth step in which a second transfer unit transfers the materials discharged from the first kneading unit;

a fifth step in which a circulation unit circulates the materials transferred by the second transfer unit;

a sixth step in which a coating unit comprising a storage unit connected to the circulation unit so as to store a part of the materials circulated by the circulation unit, and configured to coat a battery sheet with the materials stored in the storage unit; and a seventh step in which a pressure-applying unit applies a pressure to at least one from among the materials transferred by the first transfer unit, the materials transferred by the second transfer unit, and the materials circulated by the circulation unit, wherein a closed space is defined by the first supply unit, the first transfer unit, the first kneading unit, the second transfer unit, the circulation unit, and the storage unit such that they communicate with each other, and wherein a space control unit is further provided so as to control the space such that a pressure of the space is reduced or otherwise such that the space is filled with an inert gas.

13. The battery electrode slurry processing method according to claim 12, wherein the first kneading unit is one of a plurality of first kneading units, and wherein the plurality of the first kneading units are arranged in parallel.

14. The battery electrode slurry processing method according to claim 13, wherein a battery electrode slurry forming apparatus is connected to the battery electrode slurry distributing apparatus, and configured to form the battery electrode slurry to be supplied to the battery electrode slurry distributing apparatus, and wherein the battery electrode slurry forming apparatus is arranged at a position that is higher than that of the battery electrode slurry distributing apparatus.

15. The battery electrode slurry processing method according to claim 12, wherein the second transfer unit comprises an inlet configured to receive the materials discharged from the first kneading unit so as to transfer the materials thus received, and an outlet configured to discharge the materials transferred via the inlet, and wherein the second transfer unit further comprises a second kneading unit arranged between the inlet and the outlet, and configured to knead the materials transferred from the inlet, and to continuously discharge the materials thus kneaded toward the outlet.

16. The battery electrode slurry processing method according to claim 15, wherein there is a plurality of at least one from among the first kneading units and the second kneading units, wherein, in a case in which there is a plurality of the first kneading units, the plurality of first kneading units are arranged in parallel, wherein, in a case in which there is a plurality of the second kneading units, the plurality of second kneading units are arranged in parallel, and wherein each of the first kneading units and each of the second kneading units are independently controlled such that a sum total of throughputs of the first kneading units is equal to a sum total of throughputs of the second kneading units.

17. The battery electrode slurry processing method according to claim 15, wherein a battery electrode slurry forming apparatus is connected to the battery electrode slurry distributing apparatus, and configured to form the battery electrode slurry to be supplied to the battery electrode slurry distributing apparatus, and wherein the battery electrode slurry forming apparatus is arranged at a position that is higher than that of the battery electrode slurry distributing apparatus.

18. The battery electrode slurry processing method according to claim 12, wherein a battery electrode slurry forming apparatus is connected to the battery electrode slurry distributing apparatus, and configured to form the battery electrode slurry to be supplied to the battery electrode slurry distributing apparatus, wherein the battery electrode slurry forming apparatus is arranged at a position that is higher than that of the battery electrode slurry distributing apparatus.

19. A battery electrode slurry distributing method employed in a battery electrode slurry distributing apparatus configured to distribute a battery electrode slurry to a plurality of connection units each configured to transfer the distributed battery electrode slurry to manufacture battery electrodes with the battery electrode slurry, the battery electrode slurry distributing method comprising:

a first step in which a battery electrode slurry is circulated through the circulation unit connected to the plurality of connection units in a state in which a pressure is applied to the battery electrode slurry; and a second step in which a supply of the battery electrode slurry circulated in the first step to each of the plurality of connection units is controlled.

20. The battery electrode slurry distributing method according to claim 19, wherein in the second step, in a period in which any one from among the plurality of connection units is allowed to receive the supply of the battery electrode slurry, the supply of the battery electrode slurry to the connection units other than the connection unit thus allowed to receive the supply of the battery electrode slurry is inhibited.

* * * * *